(12) United States Patent
Held et al.

(10) Patent No.: US 10,421,489 B2
(45) Date of Patent: Sep. 24, 2019

(54) METHOD FOR RUNNING-DIRECTION-DISCREPANT SIDEWAYS MOVEMENT OF AN EARTH WORKING MACHINE, AND EARTH WORKING MACHINE CONFIGURED TO EXECUTE SAID METHOD

(71) Applicant: Wirtgen GmbH, Windhagen (DE)

(72) Inventors: Hanjo Held, Windhagen (DE); Cyrus Barimani, Königswinter (DE); Christian Berning, Zülpich (DE)

(73) Assignee: Wirtgen GmbH (DE)

( * ) Notice: Subject to any disclaimer, the term of this patent is extended or adjusted under 35 U.S.C. 154(b) by 356 days.

(21) Appl. No.: 15/498,581

(22) Filed: Apr. 27, 2017

(65) Prior Publication Data

US 2017/0327148 A1    Nov. 16, 2017

(30) Foreign Application Priority Data

May 12, 2016 (DE) .................. 10 2016 208 246

(51) Int. Cl.
*B62D 11/20*   (2006.01)
*E21C 29/22*   (2006.01)
(Continued)

(52) U.S. Cl.
CPC ............. *B62D 11/20* (2013.01); *E21C 29/22* (2013.01); *E01C 23/088* (2013.01); *E01C 23/127* (2013.01); *E21C 27/24* (2013.01)

(58) Field of Classification Search
CPC ................................. B62D 11/20; E21C 9/22
See application file for complete search history.

(56) References Cited

U.S. PATENT DOCUMENTS 3,266,846 A    8/1966 Luksch et al.
4,120,507 A *  10/1978 Miller .................... B62D 11/20
                                                              180/41
(Continued)

FOREIGN PATENT DOCUMENTS

CN    103628396 A    3/2014
DE      2932792 A1   2/1980
(Continued)

OTHER PUBLICATIONS

European Patent Office search report in European application Ep 17 16 9868.1 dated Sep. 19, 2017, 9 pp (not prior art).
(Continued)

*Primary Examiner* — Kevin Hurley
(74) *Attorney, Agent, or Firm* — Lucian Wayne Beavers; Patterson Intellectual Property Law, PC

(57) ABSTRACT

A method for sideways movement of an earth working machine (10), the earth working machine (10) comprising a machine frame (12) that stands via at least one front drive unit (18) and at least one rear drive unit (20) on a standing surface (A) of a substrate (U), which drive units (18, 20) are configured to roll on the substrate (U) in a running direction (D), the drive units (18, 20) being rotatable relative to the machine frame (12) around a steering axis (S) associated with the respective drive unit (18, 20), wherein the method-related sideways movement occurs in a sideways direction (V) that deviates from the travel direction of the earth working machine (10) determined by the respective steering angle, the method encompassing the following steps:

tilting the drive units (18, 20) relative to the standing surface (A) around a tilt axis (N) enclosing an angle, preferably a right angle, both with the associated steering axis (S) and with the running direction (D) of the drive unit (18, 20), in such a way that a pivot point (C) around which the drive units (18, 20) pivot relative to (Continued)

the substrate (U) is shifted away from a virtual intersection point (P) at which the steering axis (S), notionally prolonged toward the substrate (U), intersects the standing surface (A);

rotating the tilted drive units (18, 20) relative to the machine frame (12) around the steering axis (S) and thereby pivoting the drive units (18, 20) relative to the substrate (U) around the pivot point (C) shifted away from the intersection point (P).

28 Claims, 12 Drawing Sheets

(51) Int. Cl.
*E01C 23/088* (2006.01)
*E01C 23/12* (2006.01)
*E21C 27/24* (2006.01)

(56) References Cited

U.S. PATENT DOCUMENTS

| | | |
|---|---|---|
| 4,185,712 A | 1/1980 | Bulger |
| 7,942,604 B2 * | 5/2011 | Willis ............ B62D 7/026 404/84.05 |
| 9,068,303 B2 | 6/2015 | Berning et al. |
| 9,540,779 B2 | 1/2017 | Berning et al. |
| 9,908,571 B2 * | 3/2018 | Guntert, Jr. ......... E01C 19/4853 |
| 9,969,427 B1 * | 5/2018 | Engels ............... E01C 19/187 |
| 2012/0284989 A1 | 11/2012 | Busley et al. |
| 2015/0125252 A1 * | 5/2015 | Berzen Ratzel ....... B62D 12/02 414/800 |
| 2016/0040372 A1 | 2/2016 | Eiden |

FOREIGN PATENT DOCUMENTS

| | | |
|---|---|---|
| DE | 102013005594 A1 | 10/2014 |
| DE | 102011018222 B4 | 5/2015 |
| WO | 2016199176 A1 | 12/2016 |

OTHER PUBLICATIONS

Search Report and Office Action for corresponding Chinese patent application No. 201710335978.7, dated Jan. 21, 2019, 6 pages (not prior art).

* cited by examiner

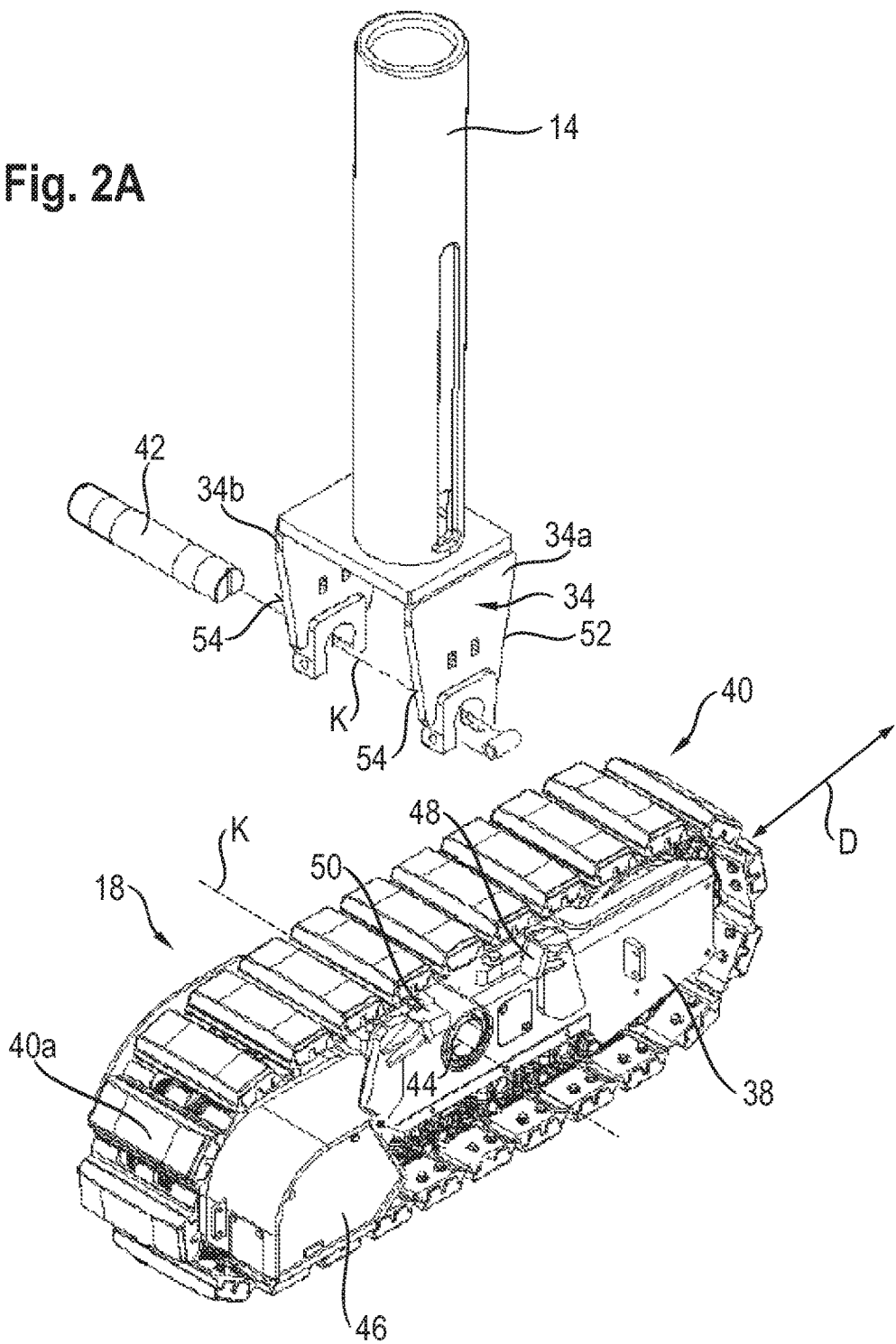

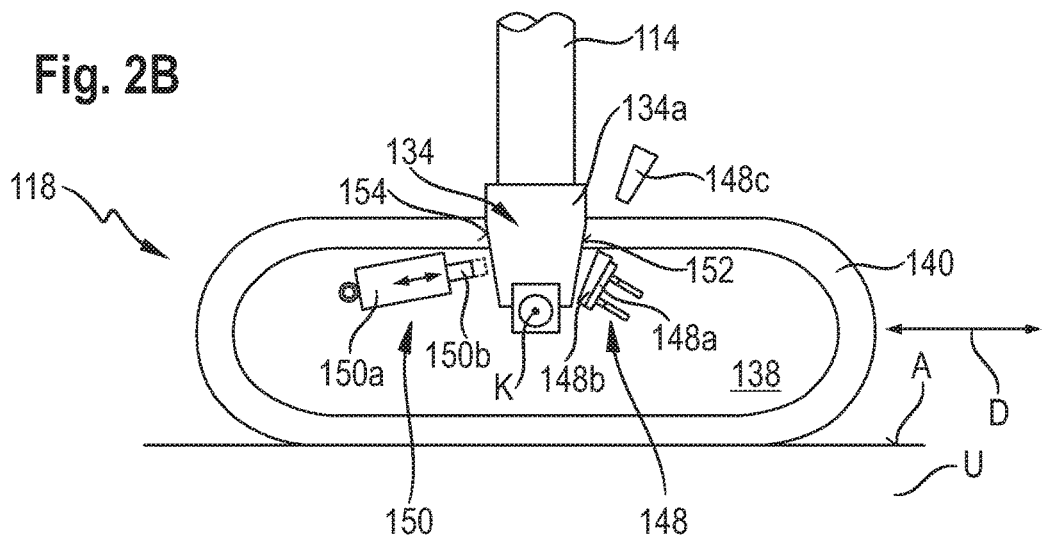
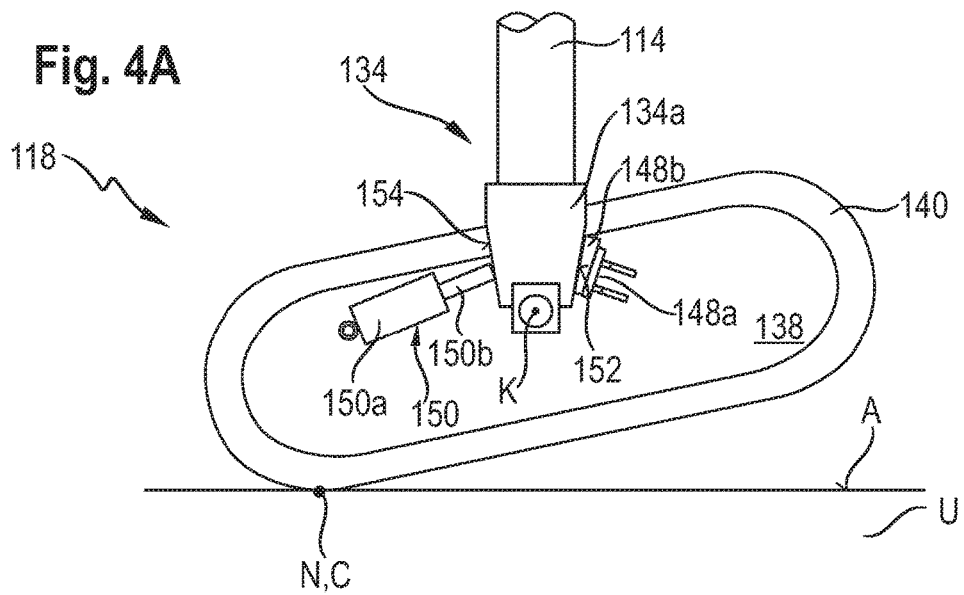

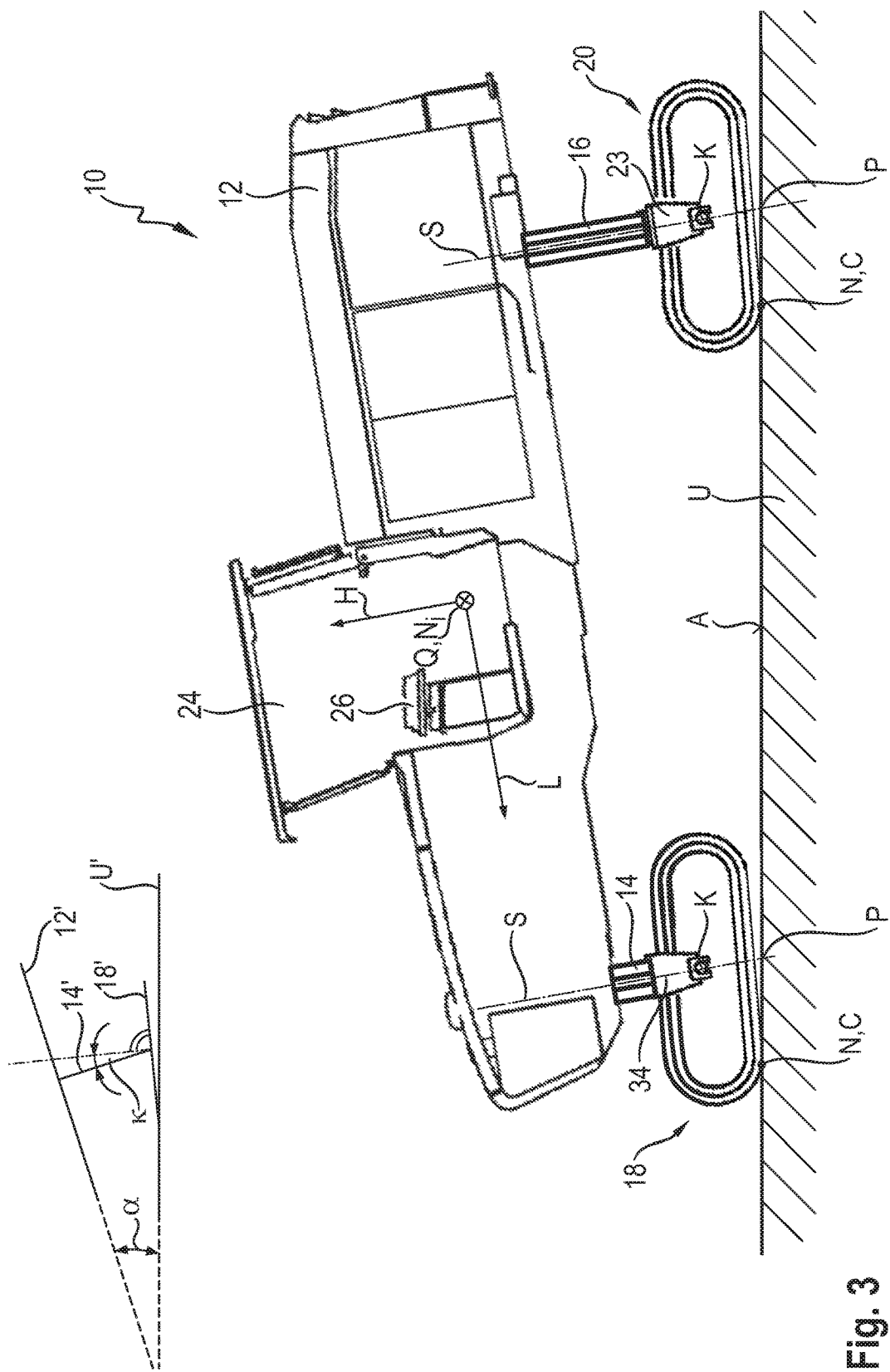

METHOD FOR RUNNING-DIRECTION-DISCREPANT SIDEWAYS MOVEMENT OF AN EARTH WORKING MACHINE, AND EARTH WORKING MACHINE CONFIGURED TO EXECUTE SAID METHOD

BACKGROUND OF THE INVENTION

1. Field of the Invention

The present invention relates to a method for sideways movement of an earth working machine such as a road miller, recycler, or surface miner, the earth working machine comprising a machine frame that stands via a propelling unit on an standing surface of a substrate, the propelling unit comprising at least one front drive unit and at least one rear drive unit, which drive units are configured to roll on the substrate in a running direction, the at least one front drive unit and the at least one rear drive unit being rotatable relative to the machine frame around a steering axis associated with the respective drive unit so that the running direction of the respective drive unit encloses a modifiable steering angle with the longitudinal machine frame direction. The present invention furthermore relates to an earth working machine configured for such a method.

2. Description of the Prior Art

Earth working machines of the species are known from DE 10 2013 005 594 A1 and from US 2016/0040372 A1.

Earth working machines, hereinafter also referred to simply as "machines," for example road millers, recyclers, or surface miners, comprise working devices having a large mass of up to several tons which are often received detachably on the machine frame; with the earth working machine in the operable state, said devices extend in a transverse machine frame direction over the entire, or almost the entire, machine width or even beyond the machine width. A working device of this kind is usually arranged on an underside, facing toward the support substrate of the earth working machine, of the machine frame. A working unit received in the working device hangs freely down toward the substrate in order to enable a working engagement with the ground or substrate. The working device is preferably a milling device that has a milling drum as a working unit and is received rotatably in a milling drum housing.

The working device of the earth working machine must be replaced from time to time, for example in order to equip or convert the machine, for example in order to adapt it for different processing tasks. Replacement of the working device or working unit must in some cases occur at the work site itself, which as a rule is far less well equipped for that purpose than a maintenance building provided therefor by the manufacturer or operator of the machine.

The dimensions of the working device along the machine width, and/or its weight, in many cases require that the machine frame and working device be transported separately to the deployment site, and that operability be established on site.

The dimensions of the working device along the machine width generally make it impossible for the machine frame, once the working device has been detached from it, to move away in collision-free fashion over the detached working device in a forward or reverse travel direction using the propelling unit, or to move in collision-free fashion by forward or reverse travel over a working device that needs to be reinstalled. Especially in the context of changing the milling drum, for example in order to convert the machine for a different processing width, the milling drum as a rule must be removed from the milling drum housing, or introduced thereinto, in a transverse machine direction.

Because of the large mass of a typical working device or of a replaceable working unit, the working device or working unit furthermore cannot readily be conveyed in a transverse machine frame direction beneath the machine frame for operable fastening thereto. This requires at least one transport device, as known e.g. from DE 10 2011 118 222 B4, but this is not always available specifically at construction sites, or even when available it is not always usable because of limited maneuvering space.

The documents recited above which describe the species teach, as a possible solution for moving the machine frame in a transverse machine frame direction away from a working device or its working unit which is to be removed, or for moving it over a working device or its working unit which is to be reinstalled, rotation of the drive units of an earth working machine in such a way that their running direction points in a transverse machine frame direction, and then displacing the machine or the machine frame in a transverse machine frame direction corresponding to the running direction established for the propelling unit or its individual drive units standing on the ground.

The complexity associated with reorientation of the drive units in a transverse machine frame direction is a disadvantage of this known solution, since the steering system of a drive unit usually does not permit a steering angle of 90° with respect to the longitudinal machine frame direction. By definition, the running direction for a steering angle of 0° points in a forward direction in the longitudinal machine frame direction. In order to orient the running direction of drive units in a transverse machine frame direction, therefore either a further rotation mechanism must be provided in addition to the steering system, or the steering system of a drive unit must be temporarily converted for alignment of its running direction in a transverse machine direction.

SUMMARY OF THE INVENTION

The object of the present invention is therefore to refine an earth working machine of the species in such a way that it can be moved sideways, without the complexity in terms of apparatus and installation necessary in the existing art, for example so that the machine frame can be moved in a transverse machine frame direction away from the working device or its working unit which is to be dismantled, and/or over a working device or its working unit which is to be reinstalled.

The present invention achieves this object by way of a method of the kind recited previously in which the method-related sideways movement occurs in a sideways direction that deviates from the travel direction of the earth working machine determined by the respective steering angle, the method encompassing the following steps:

tilting the at least one steerable front drive unit relative to the standing surface in a first tilting direction around a front tilt axis enclosing an angle, preferably a right angle, both with the associated steering axis and with the running direction of the drive unit, in such a way that a pivot point around which the tilted drive unit pivots relative to the substrate upon exertion of a steering torque around the steering axis is shifted away from a virtual intersection point at which the steering axis, notionally prolonged toward the substrate, intersects the standing surface;

rotating the tilted at least one front drive unit relative to the machine frame around the steering axis in a first rotation direction and thereby pivoting the tilted at least one front drive unit relative to the substrate around the pivot point shifted away from the intersection point;

tilting the at least one steerable rear drive unit relative to the standing surface in a second tilting direction around a rear tilt axis enclosing an angle, preferably a right angle, both with the associated steering axis and with the running direction of the drive unit, in such a way that a pivot point around which the tilted drive unit pivots relative to the substrate upon exertion of a steering torque around the steering axis is shifted away from a virtual intersection point at which the steering axis, notionally prolonged toward the substrate, intersects the standing surface;

rotating the tilted at least one rear drive unit relative to the machine frame around the steering axis in a second rotation direction and thereby pivoting the tilted at least one rear drive unit relative to the substrate around the pivot point shifted away from the intersection point.

The present invention also achieves the object recited above by means of an earth working machine of the species in which the earth working machine comprises a tilting apparatus with which the at least one steerable front drive unit is tiltable relative to the standing surface around a front tilt axis enclosing an angle, preferably a right angle, both with the associated steering axis and with the running direction of the drive unit, and with which the at least one steerable rear drive unit is tiltable relative to the standing surface around a rear tilt axis enclosing an angle, preferably a right angle, both with the associated steering axis and with the running direction of the drive unit.

The tilting apparatus of the drive units allows the tilting steps, and optionally also counter-tilting steps, explained below to be performed on the earth working machine according to the present invention. The rotation steps, and optionally also counter-rotation steps, also explained in more detail below can be performed with a steering device of the earth working machine with which the steering angle of the at least one front drive unit and of the at least one rear drive unit are modifiable. The steering device can encompass several steering apparatuses, for example one for all the front drive units and a further one for all the rear drive units, or one per drive unit.

A drive unit of an earth working machine, which can roll on the substrate via a supporting wheel, a plurality of supporting wheels, or via a drive track, touches the standing surface of the substrate in a planar standing patch because of its unavoidable deformation as a result of load in the standing region. The supported load occurring on the respective drive unit is therefore discharged into the substrate in the standing patch as an area load. In reality, what forms within the standing patch is a principal load zone with locally elevated area load values, and at least one secondary load zone in which the area load is less than in the principal load zone. In principle one could define more than two zones of locally different area loads in the standing patch, but in the present case two zones will suffice for explanatory purposes. For further explanations, the area load of the principal load zone and the area load of the secondary load zone will be assumed, in simplified fashion, to be respectively an average of the area load within the respective zones.

Because the frictional force acting between the substrate and drive unit depends on the locally acting normal force and thus on the area load, in the event a steering torque is exerted around the steering axis associated with a drive unit, a rotating slippage movement between the drive unit and the substrate, bringing about the change in the running direction of the drive unit, will occur at the drive unit firstly in the secondary load zone and lastly in the principal load zone. The pivot point around which a steered drive unit pivots relative to the substrate in the context of a steering operation is therefore located in the principal load zone. In ordinary rolling travel operation, in which the drive units roll on the substrate along their running direction, the steering axis of a drive unit, notionally prolonged toward the substrate, intersects the standing patch of the drive unit in the principal load zone; ideally, the intersection point of the steering axis through the substrate and the pivot point of the drive unit relative to the substrate are coincident. The drive unit then ideally executes, in the context of a steering operation, an exclusively rotational movement around the steering axis.

Thanks to the tilting step utilized according to the present invention, the principal load zone, and thus in turn the pivot point around which the drive unit rotates relative to the substrate, is shifted away from the intersection point in or oppositely to the running direction of the drive unit, depending on the tilting direction. This shift persists as long as the drive unit is tilted. If the drive unit is rotated, in this tilted state, around its steering axis relative to the machine frame, the drive unit pivots around the pivot point relative to the substrate, so that the steering axis executes a partial circular movement around the pivot point of the drive unit. The radius of the partial circle corresponds to the spacing between the steering axis and pivot point. The sector angle of the partial circle that is swept out corresponds to the change in the steering angle of the drive unit.

Because the steering axis is fixed with respect to the machine frame during a steering operation for design-related reasons, the machine frame likewise moves in the region of the steering axis along this partial circular path, which comprises, in the context of a suitable selection of the initial and final angles of the drive unit, a large component in a transverse machine direction and a movement component, small as compared with the latter component, in a longitudinal machine frame direction. By corresponding tilting and subsequent rotation of both the at least one front drive unit and the at least one rear drive unit, the entire machine frame can thus be moved sideways, i.e. in a transverse machine frame direction, with no need to align one or several drive units in a transverse machine frame direction for that purpose. The machine can thus be moved in a transverse machine frame direction using the steering device furnished for ordinary rolling travel operation, even though the design of the steering device does not itself permit a steering input corresponding to the machine movement direction that is achieved.

Be it noted at this juncture that the earth working machine preferably comprises a steering device whose steering operation satisfies the Ackermann condition, so that there exists for the rolling plane of each steered drive unit a radius ray orthogonal thereto, such that all the radius rays of drive units having steering input meet at the instantaneous pole of the machine around which the machine is rotating in the context of ordinary rolling curve travel operation. Because of the preferred conformity with the Ackermann condition, the travel direction of the machine when traveling in a curve deviates slightly from the running directions of the individual steered drive units.

For further clarification, be it noted that it is sufficient if the tilting movement brings about a weight shift in the standing region of a drive unit, and consequently a shift of the pivot point. The drive unit does not need to be tilted so much that it lifts off from the standing surface of the substrate at the intersection point of the steering axis, although this is not to be excluded.

With the tilting steps, and subsequent rotation of the tilted at least one front and rear drive unit, proposed according to the present invention, the entire machine frame can be shifted in a transverse machine frame direction.

An even greater distance can be traveled in a transverse machine frame direction if the following further steps are performed in the context of the method according to the present invention:

counter-tilting the at least one front drive unit relative to the standing surface around the tilt axis in a tilting direction opposite to the first tilting direction and thereby shifting the pivot point to a site remote from the intersection point, in such a way that upon completion of the counter-tilting, the intersection point is located between the current pivot point and the site of the pivot point after the last pivoting;

counter-rotating the counter-tilted at least one front drive unit relative to the machine frame around the steering axis in a rotation direction opposite to the first rotation direction and thereby counter-pivoting the counter-tilted at least one front drive unit relative to the substrate around the pivot point shifted away from the intersection point;

counter-tilting the at least one rear drive unit relative to the standing surface around the tilt axis in a tilting direction opposite to the second tilting direction and thereby shifting the pivot point to a site remote from the intersection point, in such a way that upon completion of the counter-tilting, the intersection point is located between the current pivot point and the site of the pivot point after the last pivoting;

counter-rotating the counter-tilted at least one rear drive unit relative to the machine frame around the steering axis in a rotation direction opposite to the second rotation direction and thereby counter-pivoting the counter-tilted at least one rear drive unit relative to the substrate around the pivot point shifted away from the intersection point.

"Tilting" and "counter-tilting" are operations that substantially correspond to one another, except that the tilting direction in the context of counter-tilting is opposite to that of tilting. If the counter-tilting occurs starting from the tilted state of the drive unit, the standing patch, and with it the pivot point of the drive unit relative to the substrate, is first brought closer to the intersection point and then, maintaining the shifting direction beyond the intersection point, moved away from it again.

Counter-tilting can be executed in sub-steps, for example in that firstly, in a first sub-step, the tilted drive unit is moved back into the untilted position in which it is located in the context of conventional rolling travel operation. In a second sub-step, counter-tilting can then be accomplished starting from the previously attained untilted rolling position of rolling travel operation. This is not intended to exclude the execution, in the rolling position of the drive unit attained between the two aforesaid sub-steps, of a movement by that drive unit which deviates from counter-tilting, for example in that the drive unit rotates because of a steering torque exerted on it and/or rolls in a forward and/or reverse direction for fine adjustment of the machine.

At the beginning of a counter-tilting step, the tilt axis of the counter-tilting step and that at the end of the immediately previous tilting step are identical. Specifically in the case of drive units elongated in a running direction as represented e.g. by track drive units, the location of the tilt axis relative to the drive unit and substrate can shift during a tilting step. The shift of the tilt axis occurs as a rule orthogonally to the extension direction of the tilt axis, i.e. usually parallel to the running direction of the respective drive unit. If a shift in the tilt axis occurs upon tilting and counter-tilting of a drive unit, the term "the tilt axis" is intended to refer to the variable-location tilt axis in all of its final and intermediate locations and orientations.

Because the pivot point of the drive unit is located after counter-tilting on the other side, as compared with after the rotation preceding counter-tilting, of a plane that is orthogonal to the running direction of the drive unit and contains the intersection point, a given drive unit must be counter-rotated, after counter-tilting, with a rotation direction opposite to the rotation direction of the rotation step performed after tilting in order to move the machine frame, connected to the drive unit, farther sideways in the same direction in which it was already moved upon rotation after tilting.

It is thus possible to cover a distance of almost any length in a transverse machine direction if the steps of tilting and rotation on the one hand, and counter-tilting and counter-rotation on the other hand, are performed iteratively and alternatingly on the drive units involved, i.e. on a given drive unit, a tilt, counter-tilt, tilt, counter-tilt, etc. take place in succession, a rotation step being performed after each tilting step and a counter-tilting step, and a counter-rotation step between each counter-tilting step and tilting step.

Preferably the steering angle changes upon rotation and counter-rotation are of the same magnitude on a drive unit, particularly preferably on all drive units, so that the motion components of the machine frame in a longitudinal machine frame direction, which are unavoidable because of the partial circular movement, cancel one another out, preferably cancel one another out for each pair of a rotation step and counter-rotation step.

The first and the second tilting direction, i.e. the tilting directions of the at least one front drive unit and of the at least one rear drive unit upon tilting, can be co-directional, which then requires that the first and the second rotation direction of the rotation step performed after tilting also be co-directional. The tilting directions upon counter-tilting and the rotation directions upon counter-rotation are then consequently also co-directional. The advantage of co-directional tilting and counter-tilting is that the spacing of the pivot points of the individual drive units relative to one another does not change, or changes only to a negligible extent; this considerably reduces the occurrence of undesired (because they are uncontrollable) slippage movements of the drive units relative to the substrate during rotation and/or counter-rotation.

Alternatively, however, the first and the second tilting direction can also be counter-directional, which in turn requires that the first and the second rotation direction also be counter-directional. In this case the spacing of the pivot points of the at least one front drive unit on the one hand and of the at least one rear drive unit on the other hand changes between tilting and rotation on the one hand, and counter-tilting and counter-rotation on the other hand.

Because of the kinematics required for it, it is more difficult to simultaneously counter-directionally tilt and then rotate, or simultaneously counter-directionally counter-tilt and then counter-rotate, the at least one front drive unit and the at least one rear drive unit. Although simultaneous counter-directional tilting and counter-tilting and simultaneous rotation and counter-rotation are technically possible in principle, a slippage movement in a longitudinal machine frame direction nevertheless unavoidably occurs in that context between the propelling unit and the substrate, unpredictably in terms of whether it occurs only at at least one front drive unit, only at at least one rear drive unit, or in an (also not predictable) ratio on all the drive units of the propelling unit. The reason for this is that with simultaneous counter-directional rotation and counter-rotation of the front and rear drive units the unavoidable movement components in a longitudinal machine frame direction which then likewise simultaneously occur are oppositely directed at at least one front drive unit on the one hand and at at least one rear drive unit on the other hand.

Because the movement components of the machine frame in the region of the at least one front drive unit and in the region of the at least one rear drive unit are in the same direction in a context of co-directional rotation and counter-rotation, the movement of the machine frame in a longitudinal machine frame direction in a context of simultaneous co-directional rotation and counter-rotation can be performed without appreciable slippage between the propelling unit and the substrate.

In principle, the at least one front and/or at least one rear drive unit can be tiltable by way of a separate tilting apparatus that brings about by means of a tilt actuator, for example a hydraulic piston/cylinder unit or an electric-motor spindle drive, the tilting movement and/or counter-tilting movement of a drive unit relative to the standing surface of the substrate and thus also relative to the machine frame. Hydraulic energy is always available on an earth working machine, so that a hydraulic tilt actuator can readily be supplied with energy on the machine.

It is preferred, however, if separate additional actuators are not required for performing the tilting or counter-tilting movement.

On earth working machines the machine frame is often connected to the drive units vertically adjustably, for example via hydraulic piston/cylinder arrangements; according to an advantageous refinement of the present invention, the vertical adjustability of the machine frame relative to the at least one front and/or the at least one rear drive unit is utilized in order to bring about the tilting movement and/or the counter-tilting movement of the respective drive unit relative to the standing surface.

Provision can therefore be made that the machine frame is connected to the at least one front drive unit and/or to the at least one rear drive unit via a lifting unit, in such a way that the machine frame is orientable at a modifiable pitch angle around a pitch axis orthogonal to the longitudinal machine frame direction and parallel to the standing surface, the tilting and/or counter-tilting of the steerable drive units relative to the substrate being brought about by modifying the pitch angle of the machine frame.

As the pitch angle of the machine frame is modified, a tipping movement occurs between the machine frame and the at least one tiltable drive unit around a tipping axis parallel to the tilt axis of the drive unit. The tilting apparatus can thus encompass the lifting unit and a tipping limitation apparatus, the tipping limitation apparatus limiting a tipping angle, occurring upon a change in the pitch angle, between the machine frame and the at least one tiltable drive unit to a value that is smaller in terms of magnitude than the maximum achievable pitch angle between the machine frame and standing surface.

Because of this angular correlation between the maximum possible tipping angle and the maximum possible pitch angle, tilting of the at least one front drive unit and/or of the at least one rear drive unit around the tilt axis can be brought about in simple fashion by modifying the pitch angle. This is because when the pitch angle exceeds in magnitude the maximum achievable tipping angle, the tilting movement of the drive units begins as the pitching movement continues, in the sense of a further increase in the magnitude of the pitch angle.

The aforesaid lifting unit usually encompasses one lifting column of modifiable length per drive unit, by means of which the respective drive unit is connected, in a manner known per se, shiftably in a vertical direction relative to the machine frame. Preferably, the relative vertical position of each drive unit connected vertically adjustably to the machine frame can be modified separately from the vertical position of the respective remaining drive units. This need not be the case, however. In order to achieve the advantages of the present invention it is sufficient if only all the front drive units together, and/or all the rear drive units together, are arranged vertically adjustably fashion on the machine frame.

In terms of design, the tipping angle can most easily but also most effectively be limited by a mechanical stop, so that according to an advantageous refinement of the present invention, the tipping limitation apparatus on the at least one tiltable drive unit encompasses a mechanical stop that, by modification of the pitch angle of the machine frame, can be brought into an abutting engagement, which limits a relative tipping of the machine frame and drive unit around the tipping axis, with a mechanical counter-stop of a component or component portion rotatable around the pitch axis together with the machine frame.

The mechanical stop can also be constituted only temporarily, for example by temporary placement of a stop component on the earth working machine. A stop component of this kind can be embodied in physically stable fashion as a wedge whose one wedge surface can serve as a stop surface for an abutting engagement. The other surface of the wedge, tilted through a wedge angle with respect to the stop wedge surface, can serve as a mounting wedge surface for mounting the wedge on the machine, for example on the drive unit or on a component on the machine frame, such as the lifting column or a structure fixedly connected to the lifting column.

Preferably the tipping limitation apparatus limits the tipping angle in both oppositely directed tipping directions around the tipping axis, so that both a tilt and a counter-tilt can be brought about by the lifting unit. For individual adaptation of the tilting behavior of drive units of the earth working machine discussed here to particular existing boundary conditions, it is advantageous if the mechanical stop and/or the mechanical counter-stop is provided in a modifiable location on the machine part that carries it, in order to modify the maximum possible tipping angle between the machine frame and drive unit. For example, it is possible to modify the magnitude of a limit pitch angle the exceedance of which causes initiation of the tilting movement of the at least one tiltable drive unit.

Modifiability of the location of the stop and/or counter-stop can also be implemented by way of the aforesaid stop component attachable only temporarily onto the earth working machine, for example by the fact that stop components having different dimensions are available so they can be arranged on the machine. The earth working machine can carry with it for that purpose a set of stop components having different dimensions.

In the preferred case recited previously, in which the lifting unit encompasses at least one longitudinally and vertically adjustable lifting column that is coupled tippably around the tipping axis to the at least one tiltable drive unit, the coupling region between the lifting column and drive unit can be used in terms of design to constitute the aforementioned mechanical stop and mechanical counter-stop. For this, for example, the mechanical stop can be provided on a receiving structure of the drive unit on which a rolling support component, for example a support wheel, a plurality of support wheels, or a drive track, is received in circulatingly movable fashion. The counter-stop can likewise be provided on the lifting column or, even more preferably, on a coupling structure tippably coupling the lifting column to the drive unit. The lifting column can thereby be relieved of the loads that occur during an abutting engagement of the stop and counter-stop.

It is conceivable in principle that as the tilt angle becomes greater, the at least one tiltable drive unit rests on the substrate with a region of its receiving structure or of a frame of the drive unit, so that upon exceedance of that tilt angle the drive unit stands on the substrate no longer with a rolling support element but instead with a stable region, configured specifically for that purpose, of the aforementioned receiving structure or of the drive unit frame. This region can encompass a support component configured for standing on the substrate.

On the other hand, however, it is preferred if the drive unit comprises a drive track or a plurality of support wheels arranged one behind another in a running direction, so that the drive unit is longer in a running direction than it is high. It is then possible, in a preferred refinement of the present invention, for the at least one tiltable drive unit, even in a position tilted relative to the substrate, to stand on the standing surface with a support wheel or with the drive track. The drive unit can thus always stand on the substrate with the same component or the same subassembly that also stands during normal rolling travel operation and is sufficiently configured therefor.

The earth working machine of the present invention preferably comprises a control apparatus that is configured to execute, upon corresponding activation, a sideways movement control function in accordance with which the above-described method for sideways movement of the machine is performed in a sideways direction that deviates from the travel direction of the earth working machine determined by the respective steering angles.

A control apparatus of this kind can encompass at least a microprocessor or a stored-program controller. The control apparatus preferably encompasses a data memory in which operating parameters for machine operation, in particular for propulsion operation and steering operation of the machine, are stored and can be retrieved by the control apparatus. The term "data memory" can be realized by way of a volatile and/or a nonvolatile data memory. In addition, at least a portion of the data memory can be connected or connectable only temporarily to the control apparatus, as a replaceable data medium.

The data memory can encompass dynamic memories, one or more memory modules in the form of application specific integrated circuits (ASICs), memory chip apparatuses, optical or magnetic memory apparatuses, in particular disk memory apparatuses, flash memory apparatuses, or any other medium that can be used to store data in a manner that can be accessed by a processor. The data memory can be provided on a single computer platform, or distributed over a plurality of computer platforms.

The data memory can contain a computer program product that contains software executable by the aforesaid processor, instructions, or program modules, which upon their execution can furnish data or can in another fashion cause a computer system to allow an object to be implemented or operated in a defined manner.

The control apparatus furthermore preferably comprises an input/output module for inputting to the control apparatus, and/or outputting therefrom, instructions and/or data for processing by the at least one microprocessor or stored-program controller. The control apparatus can furthermore encompass a display apparatus, for example a screen, in order to furnish to a machine operator information regarding current operation or regarding data and instructions required for a desired operating mode.

The control apparatus can furthermore encompass transfer media. Transfer media can encompass any reified medium which serves to cause a software program executable by a processor, instructions executable by a processor, or program modules located on the medium, to be read and executed by a processor. Transfer media encompass wire, cables, optical-fiber and wireless media, as known in the existing art.

The term "processor" or "microprocessor" as used above can refer at least to all-purpose processing apparatuses or to one configured for a specific purpose, and/or to a logic system of that kind that will be readily understood by one of average skill in the art. Such processors can encompass single- or multi-threading processors, central processing apparatuses, parent processors, graphics processors, media processors, and the like, but are not limited thereto.

The earth working machine according to the present invention can furthermore comprise sensors that are connected in data-transferring fashion to the control apparatus, for example vertical position sensors that can separately detect the vertical position of the machine frame with regard to the at least one front drive unit and the at least one rear drive unit, in order to be able to detect therefrom whether, and if so to what extent, the machine frame is tilted around the pitch axis with regard to the substrate on which it stands.

The sensors can furthermore encompass steering angle sensors in order to detect a steering angle of a steerable drive unit and transfer it to the control apparatus. The control apparatus is configured to apply control to steering actuators on the earth working machine in order to modify the steering angle of one or more drive units, and is configured to apply control to lifting actuators in order to effect a vertical adjustment of the machine frame. The control apparatus is furthermore configured to apply control, for operation, to a motion drive system of the machine and to the working device.

Additionally or alternatively, the sensors can comprise a tilt sensor that detects the tilt of the machine frame around the pitch axis in terms of a reference plane orthogonal to the effective direction of gravity, and transfer it to the control apparatus.

Activation of the control apparatus in order to execute the sideways movement control function can be effected by pushing a corresponding button, by moving a lever, or by actuating a click box on a monitor. Also conceivable is activation of the sideways movement via a remote control apparatus that can be actuated physically remotely from the machine frame and is connected in data-transferring fashion via a data transfer connection to the onboard control apparatus of the earth working machine. The data transfer connection can be configured less preferably in wire-based fashion, or preferably as a radio link. Remote control of the machine at a safe distance away from the machine frame has the advantage that a machine operator does not need to be present on the operator's platform while the machine frame performs successive pitching movements in respectively opposite pitching directions, and intermittent sideways movements. The present invention is nevertheless also intended to encompass the case in which the sideways movement of the earth working machine described here is initiated and controlled by a machine operator who is present on an operator's platform provided on the machine frame.

In the context of the earth working machine, the working device is preferably arranged on the machine frame between the at least one front and the at least one rear drive unit, as is the case, for example, with so-called "large milling machines."

BRIEF DESCRIPTION OF THE DRAWINGS

The present invention will be described in more detail below with reference to the attached drawings, in which:

FIG. 2a is a roughly schematic exploded perspective view of a drive unit, and of a lifting column carrying the drive unit, of the earth working machine of FIG. 1;

FIG. 2b is a roughly schematic side view of a drive unit with an alternative configuration of mechanical stops as compared with FIG. 2a;

FIG. 3 is a roughly schematic side view, corresponding to the perspective of FIG. 1, of the large milling machine of FIG. 1 with drive units inclined forward;

FIG. 4a is a detail view of an alternative embodiment of an earth working machine having a separate tilt actuator;

DETAILED DESCRIPTION

Figure 1:
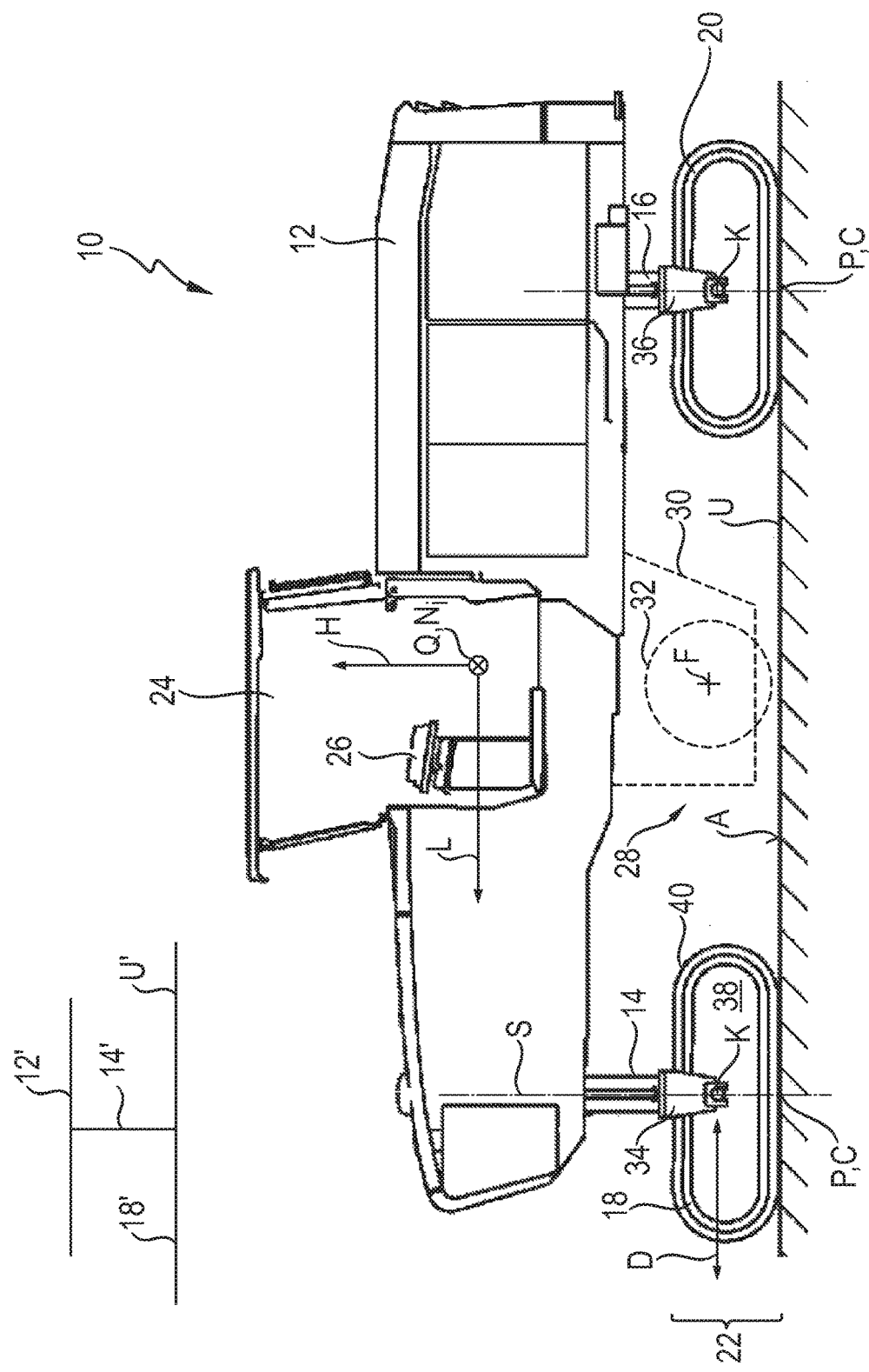
FIG. 1 is a roughly schematic side view of an embodiment according to the present invention of an earth working machine in the form of a large milling machine, in a position for rolling travel operation.

The earth working machine in general is labeled 10. It comprises a machine frame 12 that is connected in a manner known per se, via vertically adjustable front lifting columns 14 and vertically adjustable rear lifting columns 16, respectively to front drive units 18 and to rear drive units 20. Front drive units 18 and rear drive units 20 stand on a standing surface A of a substrate U, and constitute a propelling unit 22.

The viewer of FIG. 1 is looking toward earth moving machine 10, or simply the "machine," in transverse machine frame direction Q that is orthogonal to the drawing plane of FIG. 1. Longitudinal machine frame direction is labeled L, and proceeds parallel to the drawing plane of FIG. 1. Vertical machine direction H also proceeds parallel to the drawing plane of FIG. 1 and orthogonally to longitudinal and transverse machine directions L and Q. The arrowhead of longitudinal machine frame direction L in FIG. 1 points in a forward direction. For clarification, vertical machine frame direction H is parallel to the direction in which lifting columns 14 and 16 proceed. Vertical machine direction H proceeds parallel to the yaw axis of machine 10, longitudinal machine direction L proceeds parallel to the roll axis, and transverse machine direction Q proceeds parallel to the pitch axis.

Earth working machine 10 can comprise an operator's platform 24 from which a machine operator can control machine 10 via a control console 26.

Indicated beneath machine frame 12, merely with dashed lines and only in FIG. 1, is a working device 28, in this case e.g. as a milling device 28 having a milling drum 32 which is received in a milling housing 30 and is rotatable around a milling axis F proceeding in transverse machine frame direction Q in order thereby to allow substrate material to be removed, starting from standing surface A, to a milling depth determined by the relative vertical position of machine frame 12. The vertical adjustability of machine frame 12 thanks to lifting columns 14 and 16 therefore also serves to establish the milling depth, or in general the working depth, of machine 10 in the context of earth working. Earth working machine 10 depicted by way of example is a large milling machine for which the arrangement of milling device 28 in longitudinal machine frame direction L between front drive unit 18 and rear drive unit 20 is typical. Large milling machines of this kind, or also earth-removing machines in general, usually have a transport belt for transporting removed earth material away from machine 10. A transport belt that is also present in principle on machine 10 is not depicted in FIG. 1 in the interest of better clarity.

It is not apparent from the side view of FIG. 1 that machine 10 has, both in its front end region and in its rear end region, two respective lifting columns 14 and 16 each having a respective drive unit 18 and 20 connected to it. Lifting column 14 is furthermore coupled by means of a coupling structure 34 to drive unit 18 in a manner known per se. Coupling structure 34 fits around drive unit 18 in a reverse U-shape in transverse machine frame direction Q. Coupling structure 34 is connected untippably to lifting column 14, and is tippable relative to drive unit 18 around a tipping axis K that, in the example depicted, proceeds in transverse machine frame direction Q.

Rear lifting columns 16 are connected to their respective drive unit 20 via a coupling structure 36 of substantially identical construction, for a description of which the reader is referred to the description given above of coupling structure 34.

Because drive units 18 and 20 are of substantially identical construction, only drive unit 18 will be described in further detail below as a representative of all the drive units, the explanation of that unit also to be referred to regarding description of the remaining drive units.

In the example depicted, drive unit 18 comprises a radially inner receiving structure 38 on which a circulating drive track 40 is arranged. Drive track 40 can circulate on receiving structure 38 in a rolling plane that, in the example depicted, is parallel to the drawing plane of FIG. 1 and thus parallel to longitudinal machine frame direction L. When drive track 40, in the position depicted in FIG. 1, rolls on standing surface A, drive unit 18 moves as a result parallel to standing surface A in a running direction that depends on the rolling direction and is characterized by double arrow D and lies in the rolling plane of drive track 40.

Lifting column 14, and with it drive unit 18, is rotatable by way of a steering apparatus (not depicted in further detail) around a steering axis S; an intersection point P of steering axis S notionally prolonged to substrate U intersects standing surface A beneath lifting column 14.

At a steering angle of 0°, the running direction D of drive unit 18, and of all the other drive units as well, is parallel to longitudinal machine frame direction L.

Each drive unit 18 and 20 has its own steering axis S associated with it, of which only front steering axis S is depicted in FIG. 1. Drive units 18 and 20 are preferably steerable on earth working machine 10 in accordance with the known Ackermann condition.

For the explanation below of the relative position of machine 10 and essential constituents thereof relative to substrate U upon execution of the method according to the present invention for sideways movement of machine 10, machine 10 and essential components thereof are depicted at the top left in FIG. 1 in highly abstract fashion in their relative position relative to substrate U. Machine frame 12 is depicted in stylized fashion as horizontal line 12', lifting column 14 as vertical line 14', the substrate as horizontal line U', and propelling unit 18 as horizontal line 18' coincident with substrate U'. The stylized depiction reproduces the state of machine 10 when it is set up for conventional rolling travel operation. In the example, machine frame 12 is parallel to the ground.

FIG. 2a depicts lifting column 14, drive unit 18, and coupling structure 34 in detail. Tipping axis K around which drive unit 18 can tip relative to lifting column 14 is determined by a tipping axis component 42 that, in the completely installed state, passes through a corresponding passthrough opening 44 in receiving structure 38.

A hydraulic drive motor 46, with which drive track 40 can be driven to circulate around receiving structure 38, can furthermore be arranged on receiving structure 38.

Drive track 40 is configured as a link track having a plurality of track links 40a that have a plastic cushioning surface with which they stand on the substrate.

In order to limit the tipping angle through which drive unit 18 can tip relative to lifting column 14, a respective front mechanical stop 48 and a respective rear mechanical stop 50, which come into abutting engagement with respective flank surfaces 52 and 54 on side walls 34a and 34b of coupling structure 34 in the context of a corresponding tipping movement, are provided on receiving structure 38 only on one side, for example the side depicted, or on both sides. The maximum value of the tipping angle starting from a center position, with drive unit 18 aligned horizontally and lifting column 14 oriented vertically, can thereby be defined. The maximum achievable tipping angle can be modifiable by defining mechanical stops 48 and 50 in different locations on receiving structure 38. As long as lifting column 14 is tipped around tipping axis K relative to drive unit 18 over less than the maximum possible tipping angle starting from a vertical alignment as a neutral position, drive unit 18 is ready for rolling travel operation.

FIG. 2b is a roughly schematic side view of an alternative embodiment of stops as compared with those of FIG. 2a. Components identical and functionally identical to those in FIG. 2a are labeled in FIG. 2b with the same reference characters but incremented by 100. The embodiment of FIG. 2b will be explained below only insofar as it differs from that of FIG. 2a. Otherwise the reader is referred to the statements regarding FIG. 2a for an explanation of the embodiment of FIG. 2b.

Front stop 148 is configured in FIG. 2b as a stop carrier 148a on which a stop component 148b is detachably and replaceably arranged. Stop component 148b can be bolted onto stop carrier 148a or, for example, placed on in bayonet fashion by means of a projection and groove system. Because stop component 148b needs only to ensure abutting engagement with flank surface 152, it is sufficient to ensure that stop component 148b remains on stop carrier 148a in response to the forces acting in the context of abutting engagement.

In order to modify the maximum tipping angle achievable between lifting column 114 and drive unit 118, at least one further stop component 148c, which differs in terms of dimensions from the initially recited stop component 148b, can also be carried on the earth working machine according to the present invention. In the present example, stop components 148b and 148c are wedge components having different wedge angles and a different spacing between the wedge surfaces that enclose the wedge angle between them.

In order to explain a further alternative possible configuration of the mechanical stops, rear stop 150 is embodied as a hydraulic piston/cylinder arrangement having a hydraulic cylinder 150a provided on receiving structure 138 and a piston rod 150b slidable out of and retractable into cylinder 150a in a longitudinal piston rod direction. Piston rod 150b is shown with solid lines in a position retracted more deeply into cylinder 150a, and with dashed lines in a more extended position. That end surface of piston rod 150b which faces away from cylinder 150a forms a mechanical stop surface that is configured for abutting engagement with flank surface 154. By shifting piston rod 150b relative to cylinder 150a and then blocking the hydraulic line, the position of piston rod 150b and of its end surface facing toward flank surface 154 can be established in different positions, so that a variable-position mechanical stop 150 is implemented.

It is usual for mechanical stops of only one type to be implemented on a drive unit 118, so that usually the front and the rear mechanical stop will be implemented either with replaceable components or with a hydraulically actuatable piston/cylinder arrangement.

Further types of variable-position mechanical stops are conceivable, for example by means of a spindle drive. It is likewise conceivable for the front and rear mechanical stops to be connected to only one actuator by way of a gearbox or linkage, in such a way that both stops are adjustable together by way of the one actuator. The adjustability of the stops is then counter-directionally toward or away from one another.

FIG. 3 depicts earth working machine 10, without working device 28, after a tilting step in which drive units 18 and 20 are tilted relative to substrate U around respective tilt axes N orthogonal to the drawing plane of FIG. 3. The tilt of drive units 18 and 20 relative to standing surface A of substrate U is depicted in exaggerated fashion in FIG. 3. The tilt itself is brought about by generating a pitching movement of machine frame 12 around a pitch axis Ni proceeding in a transverse machine frame direction. This pitching movement is generated in turn by establishing different relative vertical positions of machine frame 12 with respect to front drive units 18 on the one hand and rear drive units 20 on the other hand. Machine frame 12 is thus set at a pitch angle α relative to substrate U, the magnitude of pitch angle α being greater than the maximum achievable tipping angle κ between machine frame 12 and drive unit 18. A tipping movement of machine frame 12 and propelling unit 18 during a pitching movement therefore ends when the maximum tipping angle κ is reached, so that if the pitching movement of machine frame 12 continues in order to increase pitch angle α, the only possible further relative movement is a tilting movement of drive unit 18 relative to substrate U around tilt axis N.

Figure 4:
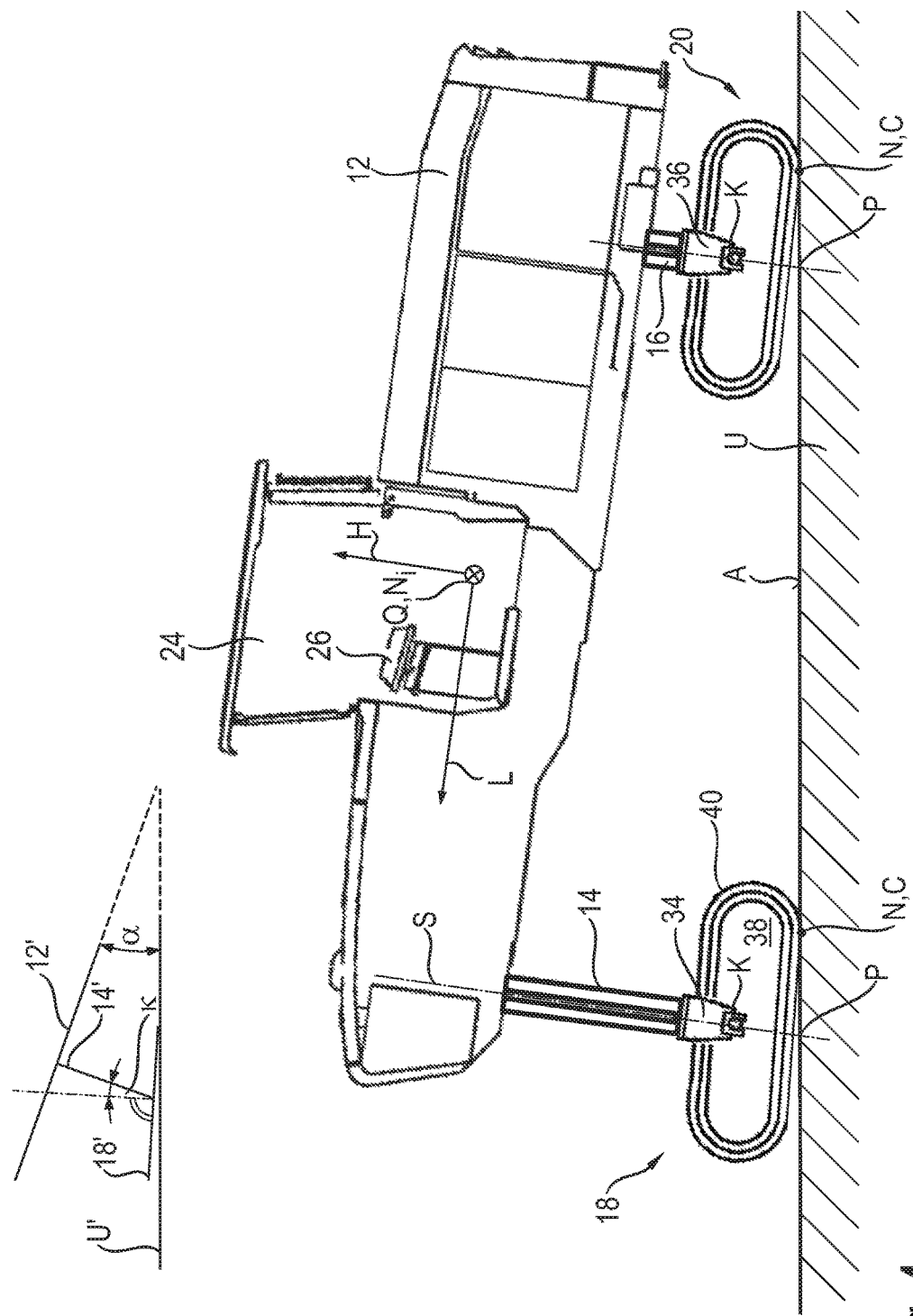
FIG. 4 shows the large milling machine of FIG. 3 with drive units inclined rearward.

FIG. 4 depicts the situation of earth working machine 10 after a counter-tilt in which drive units 18 and 20 are again tilted relative to substrate U but in an opposite tilting direction compared with the position in FIG. 3. Machine frame 12 is accordingly also shifted in an opposite pitching direction relative to the normal position shown in FIG. 1.

FIGS. 3 and 4 show a co-directional tilting and counter-tilting respectively of front drive units 18 and rear drive units 20.

When drive units 18 and 20, in the tilted or counter-tilted position respectively of FIGS. 3 and 4, are rotated relative to machine frame 12 around their respective steering axis S, they rotate around a pivot point C shifted relative to intersection point P of the respective steering axis, whereas in the untilted position shown in FIG. 1, with machine 10 in a conventional rolling travel situation, pivot point C of propelling units 18 and 20 relative to substrate U substantially coincides with intersection point P of steering axis S of the respective drive unit 18, 20.

FIG. 4a depicts an alternative possibility for tilting a drive unit relative to the substrate. This can be done by way of a separately provided tilt actuator.

In the example presented here, the hydraulically actuatable piston/cylinder arrangement 150, which can also serve to furnish a variable-position mechanical stop, is used as a tilt actuator. For this, piston rod 150b is pressed against flank surface 154 of coupling structure 134 and then further extended, so that on the one hand a tipping moment of drive unit 118 around tipping axis K relative to coupling structure 134, and on the other hand a tilting moment around tilt axis N relative to standing surface A, are brought about.

Be it expressly noted that the depiction of FIG. 4a serves merely to explain in a roughly schematic fashion the functional principle of a separately provided tilt actuator, and does not reproduce actual dimensions or dimensional relationships. This applies in particular to the load arm over which the abutting force of piston rod 150b, in abutting engagement against flank surface 154, brings about a tipping moment acting counter-clockwise in FIG. 4a around tipping axis K.

The sideways movement of earth working machine 10 will be explained in roughly schematic fashion in FIGS. 5 to 10 below.

The drawing planes of FIGS. 5 to 10 are each parallel to standing surface A according to FIGS. 1, 3, and 4. The rectangular outline of machine frame 12 is depicted in roughly schematic fashion with dotted lines. The outlines of front drive units 18 and of rear drive units 20 are also depicted as rectangles.

Figure 5:
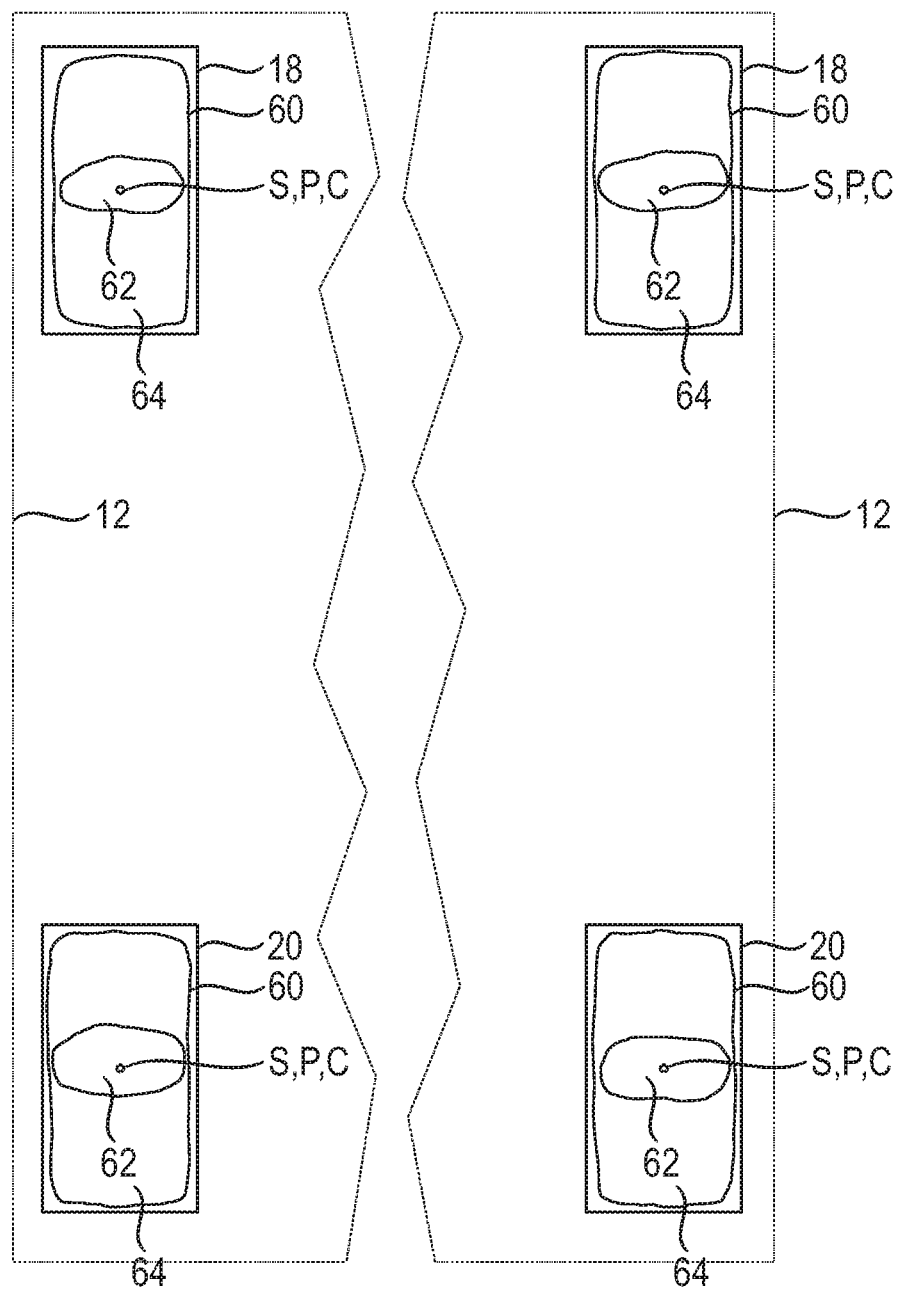
FIG. 5 is a roughly schematic depiction of the standing situation of the large milling machine in the position of FIG. 1 for rolling travel operation.

FIG. 5 reproduces in roughly schematic fashion the standing situation of earth working machine 10 of FIG. 1.

The weight of machine 10 is directed via front drive units 18 and rear drive units 20 into substrate U. Drive units 18 and 20 transfer the standing force component acting on each of them into a standing patch 60. Standing patches 60 of the individual drive units 18 and 20 are depicted in FIGS. 5 to 10 merely for the sake of explanation. In reality they can deviate considerably from what is depicted in FIGS. 5 to 10, although this is of no importance for the explanation in principle of the sideways movement procedure.

Steering axes S are usually oriented orthogonally to substrate U when earth working machine 10 is in the position with machine frame 12 oriented parallel to the standing surface; said axes, when notionally prolonged, intersect substrate U at intersection point P approximately at the center of the rectangular outlined area of drive units 18 and 20.

Because standing patch 60 is also subject to deformation, the deformation of drive track 40 decreases with increasing distance from the center of the envelope of propelling units 18 and 20, assuming an approximately centered force input of the weight into substrate U. There thus exists in the region of the center of the drive unit a principal load zone 62 with a high average area load, which can be surrounded by a secondary load zone 64 in which drive units 18 and 20 still stand on the substrate with an appreciable area load, but their area load is on average considerably lower than that of principal load zone 62.

When a drive unit 18 or 20 is steered into a position suitable for normal rolling travel operation in the standing situation depicted in FIG. 5, a slippage necessary for steering the drive units 18 and 20 will occur firstly in the more lightly loaded secondary load zone 64, and only lastly in principal load zone 62, which is more heavily loaded and thus also presents more frictional force. Pivot point C around which drive unit 18 or 20 rotates relative to the substrate is thus ideally located at intersection point P of the notionally prolonged steering axis S of the respective drive unit 18 and 20, or deviates only negligibly therefrom.

Figure 6:
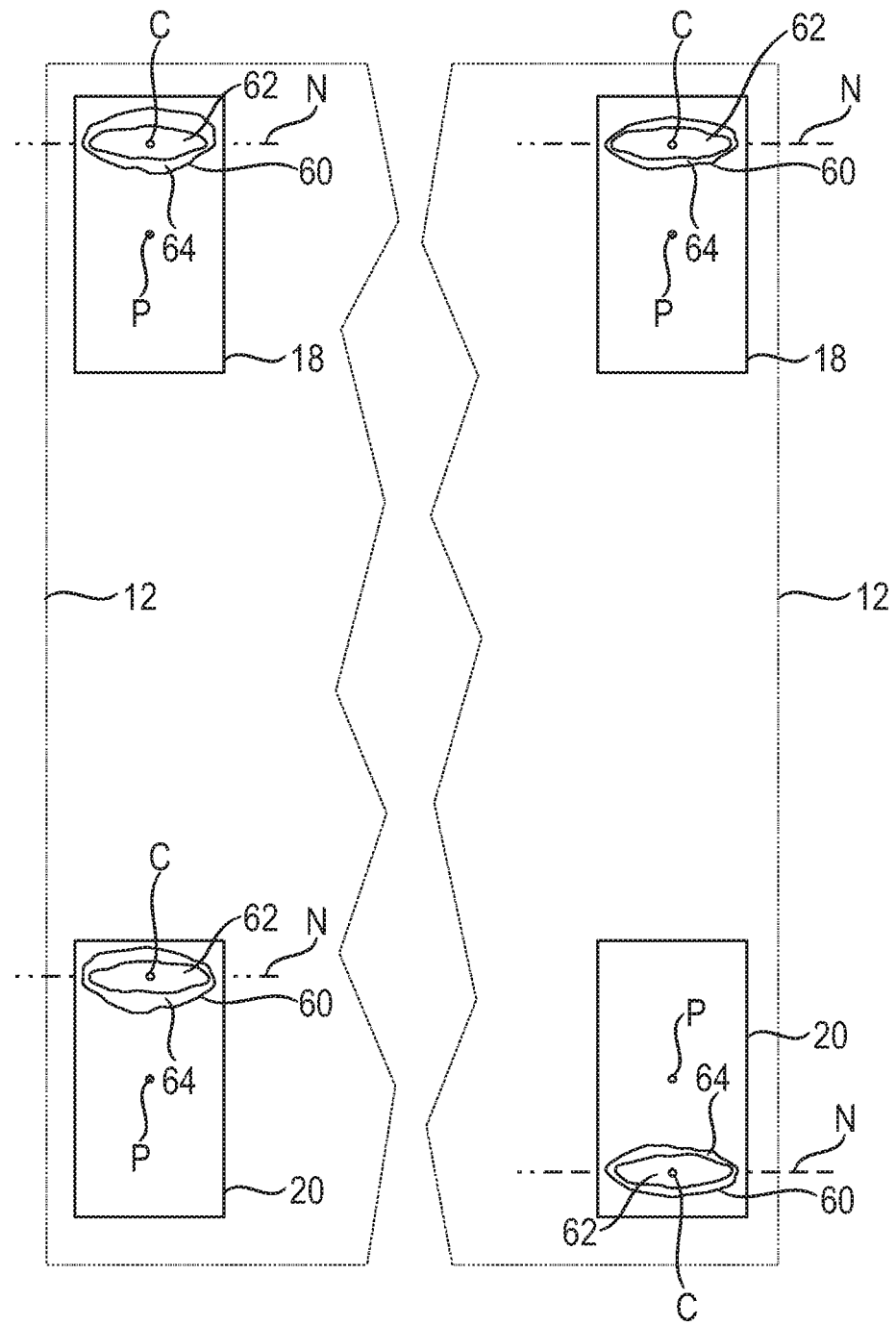
FIG. 6 shows the standing situation for a position of the large milling machine according to FIG. 3.

In order to make the depiction more compact, the left half of FIG. 6 shows the standing situation of propelling units 18 and 20 in a context of co-directional tilting, corresponding approximately and roughly schematically to the standing situation of earth working machine 10 in FIG. 3. In reality, all the drive units are in fact tilted either co-directionally or counter-directionally.

In comparison therewith, the right half of FIG. 6 depicts the situation in a context of counter-directional tilting of the front drive unit 18 and of the rear drive unit 20. Alternatively thereto, the counter-directional tilting can also be accomplished in such a way that standing patches 60 are firstly shifted toward one another, rather than away from one another as depicted in FIG. 6.

Simultaneous counter-directional tilting can occur only if the respective front and rear drive units 18 and 20 comprise separate tilt actuators that can bring about a tilt of drive units 18 and 20 relative to substrate U independently of the pitching movement of the machine frame. If, on the other hand, a counter-directional tilt or counter-tilt is brought about by a pitching movement of the machine frame, as illustrated in FIGS. 1, 3, and 4, the tilting of the respective front and rear drive units 18 and 20 can be accomplished only with an offset in time.

As a result of the tilt (whether co-directional or counter-directional), at least principal load zone 62 is shifted away from intersection point P, so that pivot point C around which the respective drive unit 18, 20 pivots relative to substrate U is also shifted away from intersection point P of the steering axis, as a rule in a shifting direction orthogonal to the respective tilt axis N. Intersection point P in fact also experiences a certain shift because of the tilt of the steering axis, but that will be ignored for the explanatory considerations that follow because it is several orders of magnitude smaller than the shift of pivot point C away from intersection point P.

It is remarkable that the relative spacings of pivot points C of the individual drive units 18 and 20 remain the same in the context of co-directional tilting, whereas they experience considerable changes in the context of counter-directional tilting.

Because of their design, drive units 18 and 20 can rotate relative to machine frame 12 only around their respective steering axis S. Because of the spacing of pivot point C of the respective drive unit 18, 20 away from intersection point P of the steering axis, what occurs when drive unit 18, 20 is rotated relative to machine frame 12, for example due to exertion of a steering torque, is a pivoting movement of steering axis S, relative to the substrate, around the respective actual pivot point C. Because steering axis S of a drive unit is substantially fixed with respect to the machine frame during a steering operation, machine frame 12 also pivots along with steering axis S in the region of the respective drive unit 18, 20 around the latter's pivot point C (see FIG. 7).

Figure 7:
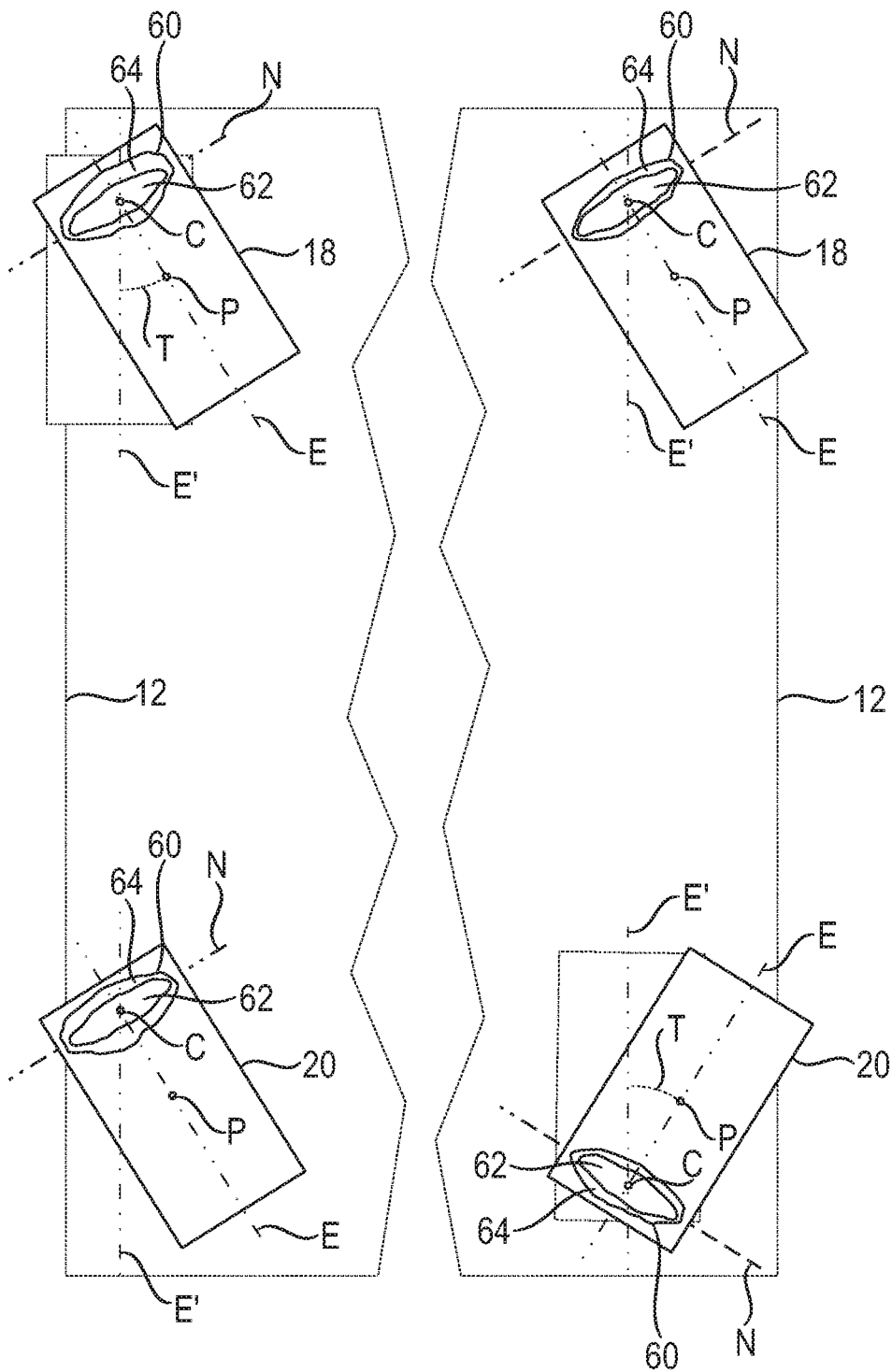
FIGS. 7 to 10 show a sequence over time of rotation, counter-tilting, counter-rotation, tilting, and rotation movements for lateral shifting of the large milling machine.

For drive units 18 and 20, the respective rolling plane E orthogonal to the drawing plane of FIG. 7 is shown in FIG. 7 on the one hand in the initial position and on the other hand after a rotation. Rolling plane E in the initial position is labeled with an apostrophe; rolling plane E in the respectively current drive unit position is labeled simply with the upper-case letter E.

The shift of intersection point P, and with it of the respective steering axis S and thus in turn of machine frame 12, along partial circular trajectory T around pivot point C, is evident.

Figure 8:
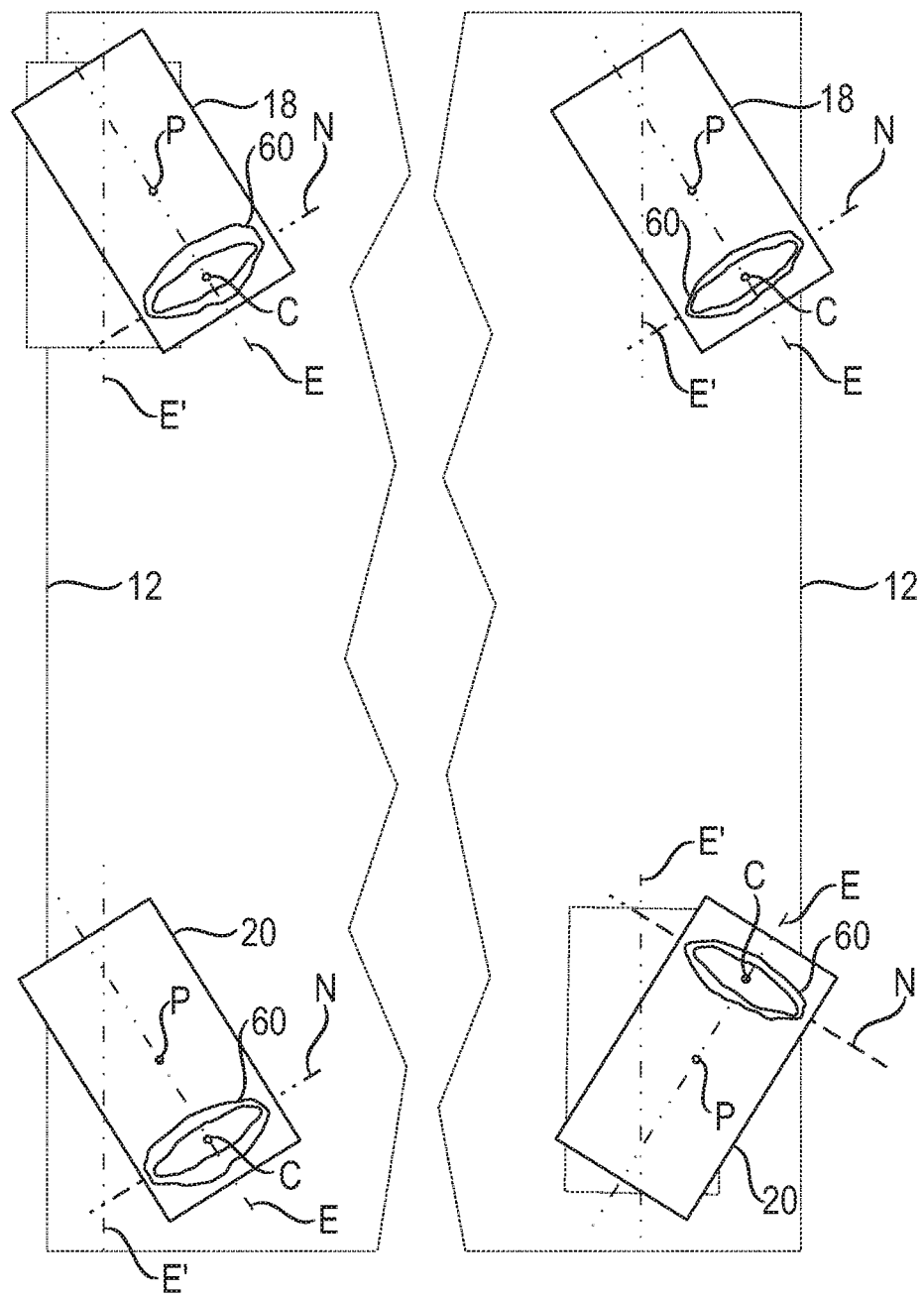

At left front drive unit 18 and at right rear drive unit 20, the original drive unit position is indicated with dot-dash lines in order to illustrate the shift achieved in each case. FIG. 8 shows the standing situation of FIG. 7 after a counter-tilt, in which context the two left drive units 18 and 20 have again been co-directionally counter-tilted. The two right drive units 18 and 20 in FIG. 8 have been counter-directionally counter-tilted.

Standing patch 60 of the respective drive units 18 and 20 is now located on the other side of intersection point P after counter-tilting, so that pivot point C of each respective drive unit 18, 20 is again located with a spacing away from intersection point P. In the interest of clarity, the load zones of the respective standing patches 60 are no longer labeled.

Figure 9:
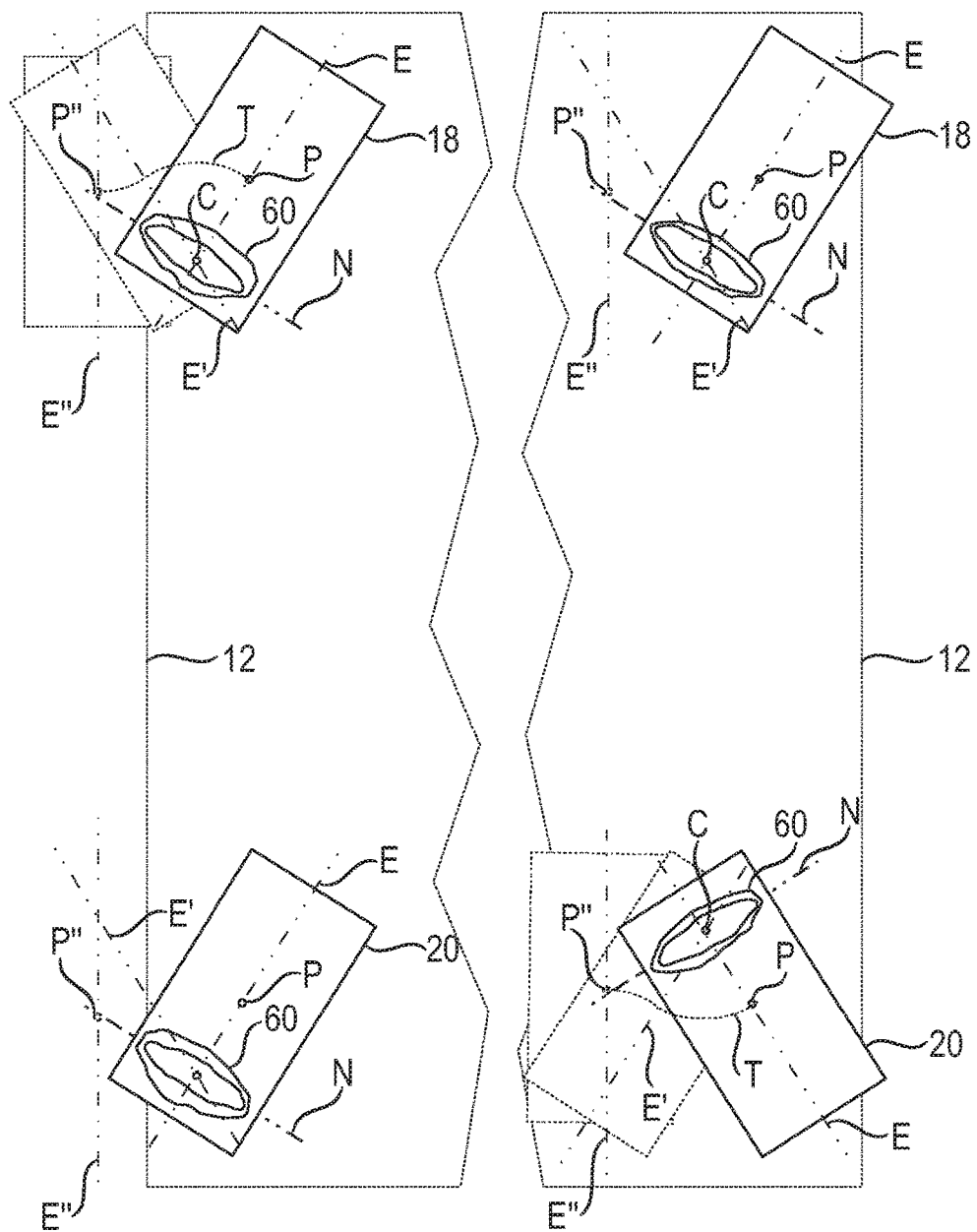

FIG. 9 shows the standing situation after a counter-rotation starting from the standing situation of FIG. 8. The current rolling plane is again labeled only with the upper-case letter E, the immediately preceding rolling plane with E', and the even earlier position of the rolling plane with E".

The rotation angle upon counter-rotation in the transition from the standing situations of FIG. 8 to those of FIG. 9, as previously for the rotation in the transition from FIG. 6 to FIG. 7, is preferably of the same magnitude for the respective front and rear drive units 18 and 20, in order to achieve a maximally parallel shift of machine frame 12 with respect to the initial position.

After counter-tilting in the transition from FIG. 7 to FIG. 8, what now occurs starting from the standing situation of FIG. 9 is again a tilt, followed by a rotation. For example, the rotation angle in the context of the transition from the situation in FIG. 9 to FIG. 10 can be selected to be half the magnitude of that upon counter-rotation into the standing situation of FIG. 9, so that the respective drive units 18 and 20 are once again aligned with a running direction D parallel to longitudinal machine frame direction L.

Figure 10:
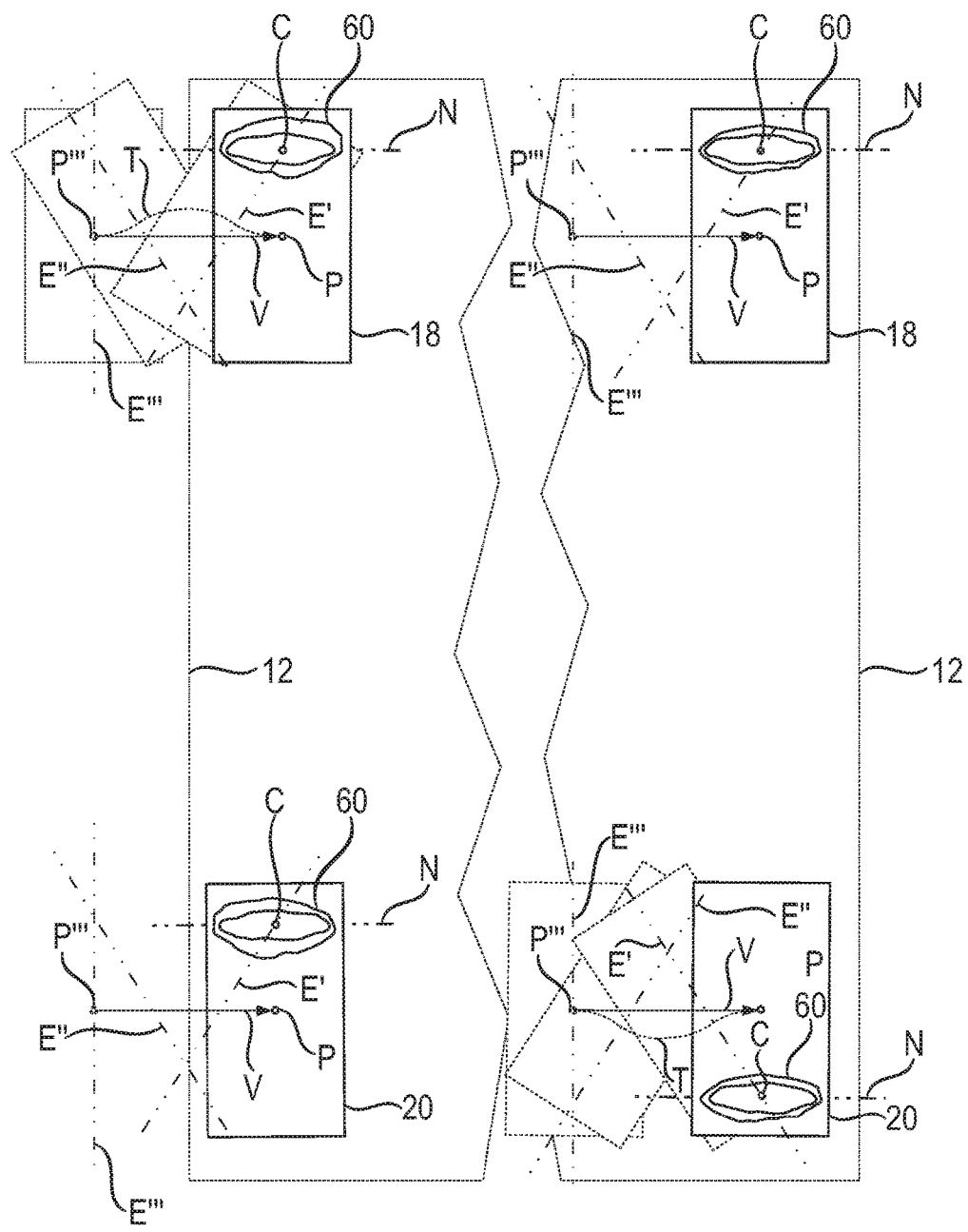

The result is evident from FIG. 10. Previous orientations of rolling plane E and of intersection points P are marked with apostrophes, the number of apostrophes indicating the number of preceding steps. Arrow V shows the total shift, achieved by way of the tilting, rotation, counter-tilting, and counter-rotation steps, of machine frame 12 in transverse machine frame direction Q.

With the method described here, whether in co-directional or in counter-directional mode, an earth working machine can be moved in a transverse machine direction to any desired location without converting the steering system and without further auxiliary equipment, and with no need for the steering system to enable an alignment of the steerable drive units 18 and 20 in transverse machine direction Q.

Figure 11:
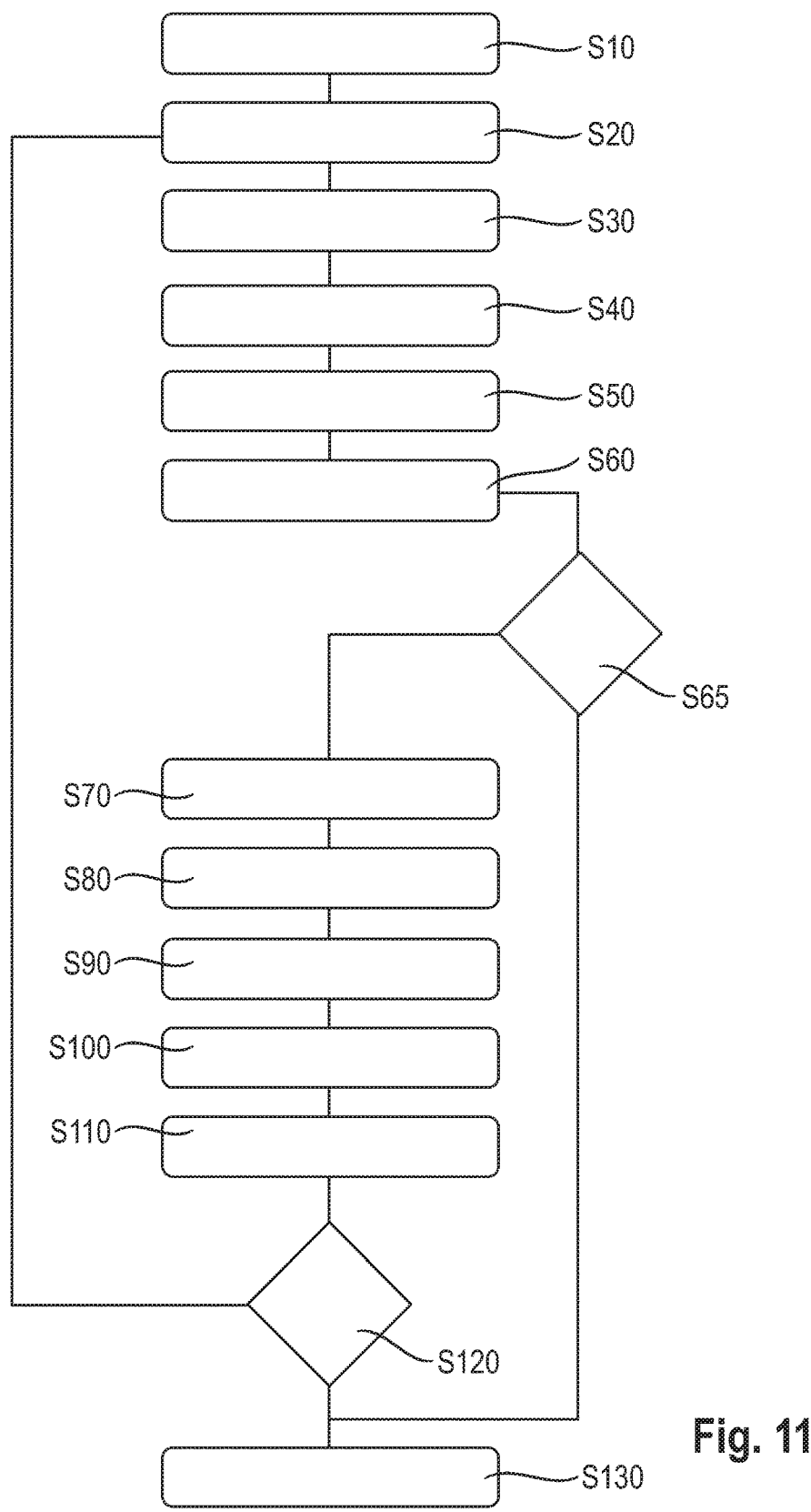
FIG. 11 is a flow chart of the method according to the present invention.

FIG. 11 depicts, in roughly schematic fashion, a flow chart for controlling the execution of a moving method for sideways movement of earth working machine 10 with co-directional tilting and rotation movements. Following a starting operation initiated by a machine operator, the control apparatus received in control console 26 firstly carries out, in step S10, a retrieval of parameters that are necessary for the sideways movement. The control apparatus may also be referred to as a controller. The parameters can be entirely or partly retrieved from a data memory, and/or acquired from the machine operator by way of an input request at control console 26. The parameters acquired can encompass: a target tilt angle of drive units 18 and 20, a maximum tipping angle max that is predetermined by the physical design or can be adjusted, a target steering angle that is to be reached at the propelling units in the context of the sideways movement, and the desired or predetermined lateral displacement distance that earth working machine 10 is intended to travel. If the machine operator has not already indicated, with the starting operation, the one of two possible sideways movement directions, this too is acquired from machine operator at control console 26.

In the next step S20, an actual pitch angle of machine frame 12 with reference to a reference plane aligned orthogonally to the effective direction of gravity is acquired via corresponding sensors, along with an actual tipping angle between the individual drive units 18 and 20 and the respective lifting column 14 to 16. The current actual steering angle of the respective drive units 18 and 20 is also detected via sensors. The vertical position of lifting columns 14 and 16 is also detected. With the data thereby acquired, it is possible to ascertain whether substrate U is tilted with respect to the horizontal, and if so in which direction. A relative pitch angle of machine frame 12 relative to substrate U can thereby be determined.

In step S30 the control apparatus ascertains, from the parameters acquired in step S10 and from the values detected in step S20, a difference value for the pitch angle for a tilting operation of the propelling units which is to be carried out first, that difference value of the pitch angle being calculated as a function of the detected actual pitch angle, the acquired target tilt angle, and the maximum tipping angle between the drive units and lifting columns. If applicable, the actual tipping angle can also be incorporated into the calculation, since with an actual tipping angle differing from 0°, the tipping angle offsets with respect to the respective maximum tipping angles are of different magnitudes.

In step S40 an adjustment travel for lifting columns 14 and/or 16 is calculated as a function of the ascertained difference value for the pitch angle. As depicted in FIGS. 3 and 4, the pitch angle of the machine frame is established by vertical adjustment of front lifting columns 14 on the one hand and of rear lifting columns 16 on the other hand.

The calculation of the adjustment travel also encompasses a check as to whether the adjustment travel is achievable starting from the detected position of lifting columns 14 and 16, or whether the vertical position of machine frame 12 must first be modified in order to achieve the displacement travel. Alternatively, depending on the detected lifting column position, the calculation can also encompass a calculation of the distribution of adjustment travels among front lifting columns 14 and rear lifting columns 16, for example depending on a displacement travel still available at the front and/or rear lifting columns 14 and 16 in a displacement direction of the lifting columns.

In a further subsequent step S50, lifting columns 14 and/or 16 are adjusted in accordance with the previously calculated adjustment travel. This establishes the pitch angle with which the target tilt angle, and the associated shift of the pivot point, are achieved.

With the completion of step S50, the tilting of drive units 18 and 20 is complete.

For sideways movement of earth working machine 10, in a subsequent step S60 the steering angles of all the drive units are adjusted, in a rotation step, to the target steering angle retrieved in step S10.

This ends the rotation step. Proceeding from the known component geometry of the relevant components of machine 10, in step S65 a query is then made as to whether or not the desired movement distance in a sideways direction parallel to transverse machine frame direction Q has been traveled. The parameters necessary for this calculation can also be acquired in the first step S10. The geometry of the drive units is relevant for this, for example, in order to allow calculation therefrom of the spacing between the pivot point after tilting or counter-tilting and the steering axis, the actual steering axis before a rotation or counter-rotation, and the target steering angle.

If the desired sideways distance has already been traveled, then in a final method step S130 the drive units are straightened, i.e. adjusted to a target steering angle of 0°. If the sideways distance has not yet been reached, the method is continued in accordance with the following steps:

The next step S70 initiates counter-tilting. In step S70 this can once again encompass the detection of current parameters such as actual pitch angle, actual tipping angle, actual steering angle, and position of the lifting columns. In a simplified method sequence this detection step S70 can also be omitted, and the procedure can continue with the parameters already known.

In step S80 the difference value for the pitch angle is then calculated for counter-tilting, analogously to the calculation in the above step S30.

In step S90 the adjustment travel for lifting columns 14 and/or 16 is calculated based on the difference angle for the pitch angle calculated in step S80.

In step S100 that then follows, lifting columns 14 and/or 16 are adjusted in accordance with the adjustment travel calculated in the previous step, so that machine frame 12 executes a pitching movement in the opposite direction as compared with the pitching movement of step S50.

After the completion of counter-tilting at the end of step S100, in a step S110 the steering angle of all the drive units is adjusted to the target steering angle for counter-rotation. The target steering angle for counter-rotation is preferably of the same magnitude as the target steering angle for rotation in step S60, but has an opposite sign.

After the completion of step S110, counter-rotation is concluded. Step S120 corresponding to step S65 is then executed, ascertaining whether or not the desired movement distance in a sideways direction has been traveled.

If the desired sideways distance has already been traveled, in a final method step S130 the drive units are straightened, i.e. adjusted to a target steering angle of 0°. If the sideways travel has not yet been reached, method execution branches back to step S20 and begins with another tilting operation, followed by a rotation step, counter-tilting step, and counter-rotation step.

Instead of a retrieval of a target steering angle in step S10, said angle can also be calculated from a predefined sideways displacement travel so that the desired distance in the indicated sideways direction can be traveled as exactly as possible.

Alternatively, execution of steps S10 to S110 can be started by the machine operator by simply specifying the movement direction. Method steps S10 to S110 are then carried out by the control apparatus until the machine operator stops the sideways movement. Automatic straightening of the drive units in accordance with step S130 can then occur.

The method sequence described in FIG. 11 relates to co-directional tilting and counter-tilting, so that all the drive units can be respectively tilted simultaneously by way of a corresponding vertical adjustment of the machine frame.

The invention claimed is:

1. A method for sideways movement of an earth working machine, the earth working machine comprising a machine frame supported by a propelling unit on a standing surface of a substrate, the propelling unit comprising at least one front drive unit and at least one rear drive unit, which drive units are configured to roll on the substrate in a running direction, the at least one front drive unit and the at least one rear drive unit each being rotatable relative to the machine frame around a respective steering axis associated with the respective drive unit so that the respective drive unit includes a modifiable steering angle relative to a longitudinal machine frame direction, wherein the sideways movement occurs in a sideways direction deviating from a travel direction of the earth working machine determined by the respective steering angles of the drive units, the method comprising the following steps:

tilting the at least one front drive unit relative to the standing surface in a first tilting direction around a front tilt axis enclosing an angle both with the steering axis and with the running direction of the respective drive unit, in such a way that a pivot point around which the tilted at least one front drive unit pivots relative to the substrate upon exertion of a steering torque around the respective steering axis is shifted away from a virtual intersection point at which the respective steering axis intersects the standing surface;

rotating the tilted at least one front drive unit relative to the machine frame around the respective steering axis in a first rotation direction and thereby pivoting the tilted at least one front drive unit relative to the substrate around the pivot point shifted away from the virtual intersection point;

tilting the at least one rear drive unit relative to the standing surface in a second tilting direction around a rear tilt axis enclosing an angle, both with the steering axis and with the running direction of the respective drive unit, in such a way that a pivot point around which the tilted at least one rear drive unit pivots relative to the substrate upon exertion of a steering torque around the respective steering axis is shifted away from a virtual intersection point at which the respective steering axis intersects the standing surface; and rotating the tilted at least one rear drive unit relative to the machine frame around the respective steering axis in a second rotation direction and thereby pivoting the tilted at least one rear drive unit relative to the substrate around the respective pivot point shifted away from the respective virtual intersection point.

2. The method according to claim 1, further comprising:
counter-tilting the at least one front drive unit relative to the standing surface around the front tilt axis in a tilting direction opposite to the first tilting direction and thereby shifting the respective pivot point to a site remote from the respective virtual intersection point, in such a way that upon completion of the counter-tilting, the respective virtual intersection point is located between a current pivot point and a site of the respective pivot point after the previous pivoting of the at least one front drive unit;

counter-rotating the counter-tilted at least one front drive unit relative to the machine frame around the respective steering axis in a rotation direction opposite to the first rotation direction and thereby counter-pivoting the counter-tilted at least one front drive unit relative to the substrate around the current pivot point;

counter-tilting the at least one rear drive unit relative to the standing surface around the rear tilt axis in a tilting direction opposite to the second tilting direction and thereby shifting the respective pivot point to a site remote from the respective virtual intersection point, in such a way that upon completion of the counter-tilting, the respective virtual intersection point is located between a respective current pivot point and a site of the respective pivot point after the previous pivoting of the at least one rear drive unit; and counter-rotating the counter-tilted at least one rear drive unit relative to the machine frame around the respective steering axis in a rotation direction opposite to the second rotation direction and thereby counter-pivoting the counter-tilted at least one rear drive unit relative to the substrate around the respective current pivot point.

3. The method according to claim 2, wherein the steps of tilting and rotating are performed, then the steps of counter-tilting and counter-rotating are performed, then the steps of tilting and rotating are repeated, and then the steps of counter-tilting and counter-rotating are repeated.

4. The method according to claim 2, wherein the machine frame is connected to at least one of the at least one front drive unit and the at least one rear drive unit via a lifting unit, in such a way that the machine frame is orientable at a modifiable pitch angle around a pitch axis orthogonal to the longitudinal machine frame direction and parallel to the standing surface, the tilting and counter-tilting of the drive units relative to the substrate being brought about by modifying the pitch angle of the machine frame.

5. The method according to claim 1, wherein both the first and the second tilting direction and the first and the second rotation direction are each co-directional.

6. The method according to claim 1, wherein both the first and the second tilting direction and the first and the second rotation direction are each counter-directional.

7. An earth working machine, comprising:
a machine frame;
a propelling unit configured to support the machine frame on a standing surface of a substrate, the propelling unit including at least one front drive unit and at least one rear drive unit, which drive units are configured to roll on the substrate in a running direction, the at least one front drive unit and the at least one rear drive unit each being rotatable relative to the machine frame around a respective steering axis associated with the respective drive unit so that the running direction of the respective drive unit includes a modifiable steering angle relative to a longitudinal machine frame direction; and a tilting apparatus with which the at least one front drive unit is tiltable relative to the standing surface around a front tilt axis enclosing an angle, both with the steering axis and with the running direction of the respective at least one front drive unit, and with which the at least one rear drive unit is tiltable around a rear tilt axis enclosing an angle, both with the steering axis and with the running direction of the respective at least one rear drive unit.

8. The earth working machine according to claim 7, wherein:
the front tilt axis encloses a right angle, both with the steering axis and with the running direction of the respective at least one front drive unit; and
the rear tilt axis encloses a right angle, both with the steering axis and with the running direction of the respective at least one rear drive unit.

9. The earth working machine according to claim 7, wherein:
the tilting apparatus includes a tilt actuator with which at least one of the at least one front drive unit and the at least one rear drive unit are tiltable around the respective front or rear tilt axis relative to the standing surface.

10. The earth working machine according to claim 9, wherein:
the tilt actuator includes a hydraulic piston/cylinder arrangement.

11. The earth working machine according to claim 9, wherein:
the tilt actuator includes an electric-motor spindle drive.

12. The earth working machine according to claim 7, wherein the machine frame is connected to at least one of the at least one front drive unit and the at least one rear drive unit via a lifting unit in such a way that the machine frame is orientable at a modifiable pitch angle around a pitch axis orthogonal to the longitudinal machine frame direction and parallel to the standing surface, the tilting apparatus including the lifting unit and a tipping limitation apparatus that limits a tipping angle around a tipping axis parallel to the tilt axis, between the machine frame and at least one tiltable drive unit, to a value that is smaller in terms of magnitude than a maximum achievable pitch angle between the machine frame and standing surface.

13. The earth working machine according to claim 12, wherein the tipping limitation apparatus on the at least one tiltable drive unit includes a mechanical stop that, by modification of the pitch angle of the machine frame, can be brought into an abutting engagement with a mechanical counter-stop of a component rotatable around the pitch axis together with the machine frame, the abutting engagement limiting a relative tipping of the machine frame and the at least one tiltable drive unit around the tipping axis.

14. The earth working machine according to claim 13, wherein at least one of the mechanical stop and the mechanical counter-stop is provided in a modifiable location on the machine part that carries it, in order to modify the maximum possible tipping angle between the machine frame and at least one tiltable drive unit.

15. The earth working machine according to claim 14, wherein the lifting unit comprises a vertically adjustable lifting column coupled tippably around the tipping axis to the at least one tiltable drive unit, the mechanical stop being provided on a receiving structure of the at least one tiltable drive unit on which a support wheel, a plurality of support wheels, or a drive track is received in circulatingly movable fashion, and the counter-stop being provided on the lifting column or on a coupling structure tippably coupling the lifting column to the at least one tiltable drive unit.

16. The earth working machine according to claim 7, wherein at least one tiltable drive unit encompasses a support wheel, a plurality of support wheels, or a drive track.

17. The earth working machine according to claim 16, wherein the at least one tiltable drive unit stands on the standing surface with a support wheel or with the drive track, even in a position tilted relative to the substrate.

18. The earth working machine according to claim 16, wherein the at least one tiltable drive unit stands on the standing surface, in the context of a position tilted relative to the substrate, with a frame that receives in circulatingly movable fashion the support wheel, the plurality of support wheels, or the drive track, or with a support component received on the frame.

19. The earth working machine according claim 7, further comprising:
   a controller configured to execute upon activation a sideways movement function including the following operations:
      tilting the at least one front drive unit relative to the standing surface in a first tilting direction around a front tilt axis enclosing an angle both with the steering axis and with the running direction of the respective drive unit, in such a way that a pivot point around which the tilted at least one front drive unit pivots relative to the substrate upon exertion of a steering torque around the respective steering axis is shifted away from a virtual intersection point at which the respective steering axis intersects the standing surface;
      rotating the tilted at least one front drive unit relative to the machine frame around the respective steering axis in a first rotation direction and thereby pivoting the tilted at least one front drive unit relative to the substrate around the pivot point shifted away from the virtual intersection point;
      tilting the at least one rear drive unit relative to the standing surface in a second tilting direction around a rear tilt axis enclosing an angle, both with the steering axis and with the running direction of the respective drive unit, in such a way that a pivot point around which the tilted at least one rear drive unit pivots relative to the substrate upon exertion of a steering torque around the respective steering axis is shifted away from a virtual intersection point at which the respective steering axis intersects the standing surface; and
      rotating the tilted at least one rear drive unit relative to the machine frame around the respective steering axis in a second rotation direction and thereby pivoting the tilted at least one rear drive unit relative to the substrate around the respective pivot point shifted away from the respective virtual intersection point.

20. The earth working machine according claim 19, wherein:
   the sideways movement function further includes the following operations:
      counter-tilting the at least one front drive unit relative to the standing surface around the front tilt axis in a tilting direction opposite to the first tilting direction and thereby shifting the respective pivot point to a site remote from the respective virtual intersection point, in such a way that upon completion of the counter-tilting, the respective virtual intersection point is located between a current pivot point and a site of the respective pivot point after the previous pivoting of the at least one front drive unit;
      counter-rotating the counter-tilted at least one front drive unit relative to the machine frame around the respective steering axis in a rotation direction opposite to the first rotation direction and thereby counter-pivoting the counter-tilted at least one front drive unit relative to the substrate around the current pivot point;
      counter-tilting the at least one rear drive unit relative to the standing surface around the rear tilt axis in a tilting direction opposite to the second tilting direction and thereby shifting the respective pivot point to a site remote from the respective virtual intersection point, in such a way that upon completion of the counter-tilting, the respective virtual intersection point is located between a respective current pivot point and a site of the respective pivot point after the previous pivoting of the at least one rear drive unit; and
      counter-rotating the counter-tilted at least one rear drive unit relative to the machine frame around the respective steering axis in a rotation direction opposite to the second rotation direction and thereby counter-pivoting the counter-tilted at least one rear drive unit relative to the substrate around the respective current pivot point.

21. The earth working machine according claim 20, wherein:
   the sideways movement function is configured such that the operations of tilting and rotating are performed, then the operations of counter-tilting and counter-rotating are performed, then the operations of tilting and rotating are repeated, and then the operations of counter-tilting and counter-rotating are repeated.

22. The earth working machine according to claim 19, wherein:
   the machine frame is connected to at least one of the at least one front drive unit and the at least one rear drive unit via a lifting unit in such a way that the machine frame is orientable at a modifiable pitch angle around a pitch axis orthogonal to the longitudinal machine frame direction and parallel to the standing surface; and
   the controller is operably connected to the lifting unit to perform the tilting operations by adjusting a travel of the lifting unit.

23. The earth working machine according to claim 22, wherein:
   the controller is operably connected to a vertical position sensor associated with the lifting unit.

24. The earth working machine according to claim 19, wherein:
   the tilting apparatus includes a tilt actuator with which at least one of the at least one front drive unit and the at least one rear drive unit are tiltable around the respective front or rear tilt axis relative to the standing surface; and the controller is operably connected to the tilt actuator to perform the tilting operations by adjusting the tilt actuator.

25. The earth working machine according to claim 19, wherein:

the controller is operably connected to steering actuators of the at least one front drive unit and the at least one rear drive unit to perform the rotating operations by adjusting the steering angles of the at least one front drive unit and the at least one rear drive unit.

26. The earth working machine according to claim 25, wherein:

the controller is operably connected to steering angle sensors associated with each of the at least one front drive unit and the at least one rear drive unit to detect the steering angles of the respective drive units.

27. The earth working machine according to claim 19, wherein:

the controller is operably connected to a tilt sensor to detect a pitch of the machine frame.

28. The earth working machine according to claim 19, wherein:

the controller is operably connected to tipping angle sensors associated with each of the at least one front drive unit and the at least one rear drive unit to detect a tipping angle of the respective drive units.

\* \* \* \* \*

UNITED STATES PATENT AND TRADEMARK OFFICE
CERTIFICATE OF CORRECTION

PATENT NO. : 10,421,489 B2
APPLICATION NO. : 15/498581
DATED : September 24, 2019
INVENTOR(S) : Held et al.

Page 1 of 1

It is certified that error appears in the above-identified patent and that said Letters Patent is hereby corrected as shown below:

In the Specification

Column 18, Line 24, replace "max" with -- κmax --.

Signed and Sealed this
Twelfth Day of November, 2019

Andrei Iancu
*Director of the United States Patent and Trademark Office*